US010920814B2

United States Patent
Bokusky et al.

(10) Patent No.: US 10,920,814 B2
(45) Date of Patent: Feb. 16, 2021

(54) BRACKET FOR MOUNTING AN ACTUATOR TO AN ACTUATABLE COMPONENT

(71) Applicant: Honeywell International Inc., Morris Plains, NJ (US)

(72) Inventors: Mark D. Bokusky, Eden Prairie, MN (US); Matthew Decker, Minneapolis, MN (US); Jason L. Ableitner, Edina, MN (US); William Atwood, Coon Rapids, MN (US); Trevor Litke, Golden Valley, MN (US)

(73) Assignee: Honeywell International Inc., Charlotte, NC (US)

( * ) Notice: Subject to any disclaimer, the term of this patent is extended or adjusted under 35 U.S.C. 154(b) by 183 days.

(21) Appl. No.: 15/946,495

(22) Filed: Apr. 5, 2018

(65) Prior Publication Data

US 2019/0309779 A1 Oct. 10, 2019

(51) Int. Cl.
  A47G 1/10 (2006.01)
  F16B 17/00 (2006.01)
  F16B 2/24 (2006.01)
  F16B 2/22 (2006.01)
  F16M 13/02 (2006.01)

(52) U.S. Cl.
  CPC .............. *F16B 17/00* (2013.01); *F16B 2/22* (2013.01); *F16B 2/245* (2013.01); *F16M 13/02* (2013.01)

(58) Field of Classification Search
  CPC .......... F16K 31/043; F16B 17/00; F16B 2/22; F16M 13/02; F16D 1/087
  USPC ....... 248/316.7; 251/129.12, 129.02, 129.03, 251/291, 292; 361/600, 679.01, 679.33, 361/679.34, 679.37
  See application file for complete search history.

(56) References Cited

U.S. PATENT DOCUMENTS

| 9,123 | A | 7/1852 | Turner |
| 14,795 | A | 5/1856 | Buss |
| 214,538 | A | 4/1879 | Westermaier |
| 1,414,354 | A | 5/1922 | Gibbs |
| 1,879,099 | A | 9/1932 | Coffey |
| 1,969,827 | A | 8/1934 | Tautz |
| 2,428,688 | A | 10/1947 | Stischer |
| 2,616,452 | A | 11/1952 | Clay et al. |

(Continued)

FOREIGN PATENT DOCUMENTS

| EP | 0612950 A1 | 8/1994 |
| EP | 1235128 A2 | 8/2002 |

(Continued)

OTHER PUBLICATIONS

"Smart-T and MT-Adapt-HW Mounting Adapter," 1 page, prior to Feb. 23, 2011.

(Continued)

*Primary Examiner* — Todd M Epps
(74) *Attorney, Agent, or Firm* — Seager Tufte & Wickhem LLP

(57) ABSTRACT

A bracket configured to mechanically couple an actuator an accessory component. The bracket may be mounted relative to the accessory component, and the bracket may allow the actuator to be mounted without the use of tools. The bracket may also allow the actuator to be mounted in each of two or more orientations such that the actuator is able to drive the accessory component in each of two directions, depending on the mounting orientation.

19 Claims, 18 Drawing Sheets

(56) References Cited

U.S. PATENT DOCUMENTS

| | | |
|---|---|---|
| 3,117,257 A | 1/1964 | Stone |
| 3,262,027 A | 7/1966 | Zaleske et al. |
| 3,295,079 A | 12/1966 | Brown |
| 3,595,505 A | 7/1971 | Burwell |
| 3,625,503 A | 12/1971 | Hall |
| 3,727,160 A | 4/1973 | Churchill |
| 3,776,275 A | 12/1973 | Updike |
| 3,849,008 A | 11/1974 | Boucher et al. |
| 3,880,534 A | 4/1975 | Schmidt |
| 4,276,692 A | 7/1981 | Casler et al. |
| 4,327,608 A | 5/1982 | Keys |
| 4,354,399 A | 10/1982 | Katayama |
| 4,433,218 A | 2/1984 | Provencher |
| 4,487,634 A | 12/1984 | Turbak et al. |
| 4,490,081 A | 12/1984 | Kuchuk-Yatsenko et al. |
| 4,527,440 A | 7/1985 | Heitman et al. |
| 4,549,446 A | 10/1985 | Beeson |
| D286,907 S | 11/1986 | Strebe |
| 4,671,540 A | 6/1987 | Medvick et al. |
| 4,683,453 A | 7/1987 | Vollmer et al. |
| D295,280 S | 4/1988 | Walser |
| 4,805,870 A | 2/1989 | Mertz |
| 4,810,213 A | 3/1989 | Chabot |
| 4,836,497 A | 6/1989 | Beeson |
| 4,887,634 A | 12/1989 | Killian |
| 5,026,197 A | 6/1991 | Johnson et al. |
| 5,118,078 A | 6/1992 | Younker |
| 5,133,265 A | 7/1992 | Lahti et al. |
| 5,187,916 A | 2/1993 | Errani et al. |
| 5,223,679 A | 6/1993 | Yoo |
| 5,236,006 A | 8/1993 | Platusich et al. |
| 5,241,292 A | 8/1993 | Bjorknas et al. |
| 5,326,006 A | 7/1994 | Giard, Jr. |
| 5,509,752 A | 4/1996 | Kocisek |
| 5,518,462 A | 5/1996 | Yach |
| 5,540,414 A | 7/1996 | Giordani et al. |
| 5,544,970 A | 8/1996 | Studer |
| 5,551,477 A | 9/1996 | Kanno et al. |
| 5,564,461 A | 10/1996 | Raymond, Jr. et al. |
| 5,581,222 A | 12/1996 | Pinaud |
| 5,634,486 A | 6/1997 | Hatting et al. |
| 5,638,927 A | 6/1997 | Cheatham et al. |
| 5,651,631 A | 7/1997 | Carmien |
| 5,765,466 A | 6/1998 | Plantan et al. |
| 5,806,555 A | 9/1998 | Magno, Jr. |
| 5,808,534 A | 9/1998 | Laffey |
| 5,887,608 A | 3/1999 | Bordelon et al. |
| 5,896,959 A | 4/1999 | Jeffries et al. |
| 5,911,595 A | 6/1999 | Orr, Jr. et al. |
| 5,954,088 A | 9/1999 | Huang |
| 5,971,378 A | 10/1999 | Sweeney |
| 6,073,907 A | 6/2000 | Schreiner, Jr. et al. |
| 6,079,704 A | 6/2000 | Buck |
| 6,322,282 B1 | 11/2001 | Kussman et al. |
| 6,422,258 B1 | 7/2002 | DuHack et al. |
| 6,505,991 B2 | 1/2003 | Roman |
| D480,450 S | 10/2003 | Saadi et al. |
| 6,644,999 B1 | 11/2003 | Tan et al. |
| 6,655,919 B2 | 12/2003 | Rossi et al. |
| 6,684,901 B1 | 2/2004 | Cahill et al. |
| 6,742,765 B2 | 6/2004 | Takano et al. |
| 6,775,132 B2* | 8/2004 | Chen ................ G06F 1/184 312/223.1 |
| 6,789,781 B2 | 9/2004 | Johnson et al. |
| D498,821 S | 11/2004 | Nortier |
| 6,837,646 B1 | 1/2005 | Minger |
| 6,848,672 B2 | 2/2005 | Cross et al. |
| 6,880,806 B2 | 4/2005 | Haikawa et al. |
| 6,932,319 B2 | 8/2005 | Kowalski |
| 6,935,615 B2 | 8/2005 | McCarty |
| 6,994,320 B2 | 2/2006 | Johnson et al. |
| 7,025,328 B2 | 4/2006 | Ulicny et al. |
| 7,031,150 B2* | 4/2006 | Chen ................ G06F 1/184 248/611 |
| 7,048,251 B2* | 5/2006 | Schreiner ............ F16K 31/055 251/111 |
| 7,074,087 B2 | 7/2006 | Szczesny et al. |
| 7,128,192 B2 | 10/2006 | Fox |
| 7,131,635 B2 | 11/2006 | Oh |
| 7,186,133 B1 | 3/2007 | Szczesny |
| 7,188,481 B2 | 3/2007 | DeYoe et al. |
| D543,003 S | 5/2007 | Helmetsie |
| 7,234,963 B1 | 6/2007 | Huang |
| D571,290 S | 6/2008 | Gebhart et al. |
| 7,395,718 B2 | 7/2008 | Obermeier |
| D587,211 S | 2/2009 | Greenslade |
| 7,494,376 B1 | 2/2009 | Foltz |
| 7,507,108 B2 | 3/2009 | Tsuji |
| D610,655 S | 2/2010 | Schmidt |
| D614,150 S | 4/2010 | Crites |
| 7,704,008 B2 | 4/2010 | Shinozaki et al. |
| 7,708,254 B2 | 5/2010 | Hertzog |
| 7,798,170 B2 | 9/2010 | Hotz |
| D629,871 S | 12/2010 | Marinoni et al. |
| 7,871,288 B1 | 1/2011 | Lee |
| D650,337 S | 12/2011 | Bonomi |
| D654,523 S | 2/2012 | Iranyi et al. |
| 8,157,242 B2* | 4/2012 | Parsons ................ F16K 35/02 251/93 |
| 8,287,207 B2 | 10/2012 | Bakken et al. |
| 8,544,801 B2* | 10/2013 | Ting ................ G06F 1/187 248/27.3 |
| D697,585 S | 1/2014 | Liu et al. |
| 8,632,054 B2 | 1/2014 | Carlson et al. |
| 8,733,735 B2 | 5/2014 | Strebe |
| 8,789,807 B2 | 7/2014 | Kreuter |
| 8,887,655 B2 | 11/2014 | Carlson et al. |
| 8,887,665 B2* | 11/2014 | Rocker ................ A01K 5/0114 119/61.2 |
| 8,935,849 B2 | 1/2015 | Gross et al. |
| 8,968,023 B1 | 3/2015 | Walters et al. |
| 8,998,173 B2 | 4/2015 | Buck |
| 9,016,662 B2 | 4/2015 | Staffiere et al. |
| 9,025,278 B1* | 5/2015 | Chen ................ G06F 1/187 360/99.15 |
| 9,423,818 B2 | 8/2016 | Gibbons, Jr. et al. |
| 9,702,474 B1* | 7/2017 | Mu ................ F16K 27/06 |
| 9,921,617 B1* | 3/2018 | Wang ................ G11B 33/027 |
| 10,289,172 B2* | 5/2019 | Yang ................ G11B 33/022 |
| 2003/0213662 A1 | 11/2003 | Fox |
| 2004/0089835 A1 | 5/2004 | Schreiner |
| 2004/0099833 A1 | 5/2004 | Haikawa et al. |
| 2004/0173770 A1 | 9/2004 | Kowalski |
| 2004/0216912 A1 | 11/2004 | Osborn, Jr. |
| 2006/0131532 A1 | 6/2006 | Oh |
| 2006/0204322 A1 | 9/2006 | Roiser |
| 2007/0176068 A1 | 8/2007 | Kuo-Chen |
| 2011/0240893 A1* | 10/2011 | Windgassen ........ F16K 31/042 251/129.13 |
| 2012/0199776 A1 | 8/2012 | Kreuter |
| 2012/0211688 A1 | 8/2012 | Carlson et al. |
| 2014/0016262 A1* | 1/2014 | Lo ................ G06F 1/187 361/679.33 |
| 2014/0224353 A1 | 8/2014 | Strebe |
| 2017/0241479 A1* | 8/2017 | Bakken ................ F16D 1/101 |
| 2017/0241560 A1* | 8/2017 | Bakken ................ F16D 1/087 |

FOREIGN PATENT DOCUMENTS

| | | |
|---|---|---|
| EP | 1672261 A1 | 6/2006 |
| EP | 1967777 B1 | 10/2009 |
| WO | 02077478 A1 | 10/2002 |
| WO | 2006121905 A2 | 11/2006 |
| WO | 2011066328 A1 | 6/2011 |
| WO | 2015108910 A1 | 7/2015 |

OTHER PUBLICATIONS

Search Report for EP Application No. 12156608.7-2422 dated Jun. 1, 2012.

(56) References Cited

OTHER PUBLICATIONS

Honeywell, "MT-Clip—Mounting Clips for MT4/MT8," 1 page, prior to Feb. 23, 2011.
Honeywell, "MT-Clip-ATP Mounting Clips for MT4MT8," 2 pages, 2006.
Honeywell, "MT4-024MT4-230 MT8-024/MT8-230 Small Linear Thermoelectric Actuators," Product Data, 5 pages, 2009.
Honeywell, "Small Linear Thermostat Actuator, MT4-024/MT4-230/MT8-024/MT8230," Mounting Instructions, 2 pages, 2006.
Honeywell, "VC6800, VC6900 Series Floating Control Valves," Product Data, 6 pages, Nov. 1996.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small On/Off Linear Valve Actuators," Product Data, 4 pages, 2010.
Honeywell, "M6061 Rotary Valve Actuators," Product Data, 6 pages, 2011.
Honeywell, "M7061 Installation Instructions," 2 pages, 2003.
Honeywell, "ML6420A30xx/ML7420A60xx," Electric Linear Valve Actuators, Installation Instructions, 2 pages, 2010.
Honeywell, "ML6435B/ML7435E Electric Linear Actuators for Floating/Modulating Control," Installation Instructions, 2 pages, 2008.
Honeywell, "N20010, N34010 Non-Spring Return Damper Actuator $20/34$ Nm ($177/300$ lb-in) for Modulating Control, Product Data," 7 pages, 2013.
Honeywell, "N20xx/N34xx Non-spring Return Direct-Coupled Damper Actuators," Wiring, 4 pages, 2012.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves," Installation Instructions, 8 pages, 2011.
Honeywell, M5003A, 2 pages, Sep. 2010.
Honeywell, M6410C/L M7410C, 2 pages, prior to Feb. 23, 2011.
"Mounting Backet and Bushing," AIT Engineering and Service, pp. 1-2, Nov. 17, 2017, (http://www.aitengineering.co.th/detail.php?id=23).
"SS-MB-43G," Swagelok, p. 1, Nov. 15, 2017, (http://www.swagelok.com/en/catalog/Product/Detail?part%3dSS-MB-43G).

* cited by examiner

BRACKET FOR MOUNTING AN ACTUATOR TO AN ACTUATABLE COMPONENT

TECHNICAL FIELD

The present disclosure pertains generally to actuator mounting assemblies.

BACKGROUND

Actuatable components are used in a wide variety of systems. For example, many industrial processes include actuatable valves to help control the flow of fluids (liquid and/or gas) in a manufacturing process. In another example, many Heating, Ventilation and/or Air Conditioning (HVAC) systems include actuatable valves such as air dampers, water valves, gas valves, ventilation flaps, louvers, and/or other actuatable valves that help regulate or control the flow of fluid (gas, liquid) in the HVAC system. Maintenance of such actuatable components often involves mounting and dismounting the actuator from the actuatable component, which in many cases requires tools and can involve significant technician time. In many cases, the actuatable components are located in tight spaces, such as behind industrial process equipment, within walls, crawl spaces, attic spaces and/or other tight areas. These areas are often poorly illuminated and/or cramped, leaving little room for tools or even a second hand. A need remains for improved devices and/or systems that promote easier mounting and/or dismounting of actuators from actuatable components or devices.

SUMMARY

The present disclosure pertains generally to actuator mounting assemblies, and more particularly, to brackets for mounting an actuator to an actuatable accessory component. The actuatable accessory component can be any suitable actuatable component such as, for example, an actuatable valve such as an air damper, a water valve, a gas valve, a ventilation flap, a louver, and/or other actuatable component.

In a first example, a bracket configured to mechanically couple an actuator with an actuator housing to an accessory component may include a body. The body may include two or more securement features. A first one of the two or more securement features may be configured to mechanically engage and form an interference connection with one or more corresponding features on a first side of the actuator housing and a second one of the two or more securement features may be configured to mechanically engage and form an interference connection with one or more corresponding features on a second opposing side of the actuator housing.

Alternatively or additionally to any of the examples above, in another example, the body may further include one or more attachment features for attaching the bracket to the accessory component.

Alternatively or additionally to any of the examples above, in another example, the one or more attachment features for securing the bracket to the accessory component may include a tang.

Alternatively or additionally to any of the examples above, in another example, the one or more attachment features for securing the bracket to the accessory component may include a hole extending through the body of the bracket.

Alternatively or additionally to any of the examples above, in another example, the first one of the two or more securement features may include a tab that is configured to engage a corresponding tab engaging feature of the actuator housing to form the interference connection with the actuator housing.

Alternatively or additionally to any of the examples above, in another example, the tab may be configured to initially bend when first engaging the corresponding tab engaging feature of the actuator housing before snapping into place to form the interference connection with the actuator housing.

Alternatively or additionally to any of the examples above, in another example, the corresponding tab engaging feature may include a slot in the first side of the actuator housing.

Alternatively or additionally to any of the examples above, in another example, the corresponding tab engaging feature may include a protrusion on the first side of the actuator housing.

Alternatively or additionally to any of the examples above, in another example, the first one of the two or more securement features may include a first tab that is configured to engage a corresponding first tab engaging feature on the first side of the actuator housing to form a first interference connection with the actuator housing and the second one of the two or more securement features may include a second tab that is configured to engage a corresponding second tab engaging feature on the second opposing side of the actuator housing to form a second interference connection with the actuator housing.

Alternatively or additionally to any of the examples above, in another example, the first tab may extend inward toward the first side of the actuator housing and the second tab extends inward toward the second opposing side of the actuator housing.

Alternatively or additionally to any of the examples above, in another example, the first tab engaging feature may include a slot in the first side of the actuator housing and the second tab engaging feature may include a slot in the second opposing side of the actuator housing.

Alternatively or additionally to any of the examples above, in another example, the first tab may extend outward away from the first side of the actuator housing and the second tab may extend outward away from the second opposing side of the actuator housing.

Alternatively or additionally to any of the examples above, in another example, the first tab engaging feature may include a protrusion on the first side of the actuator housing and the second tab engaging feature includes a protrusion on the second opposing side of the actuator housing.

In another example, a bracket configured to mechanically couple a component with an actuator may include a first plate, a second plate spaced from the first plate, and a third plate having a first end, a second end, a first lateral side, and a second lateral side. The third plate may interconnect the first plate and the second plate along the first and second lateral sides such that the first plate, the second plate and the third plate define three sides of a U channel. The first plate may define a first tab extending into the channel and the second plate may define a first tab extending into the channel. When the first tab of the first plate is engaged in a first slot of the actuator and the first tab of the second plate is engaged in a second slot of the actuator, the first tabs of the first and second plates may be configured to releasably secure the bracket to the actuator and to restrict movement of the bracket relative to the actuator.

Alternatively or additionally to any of the examples above, in another example, the first plate further may define a second tab that extends into the channel, the second plate may define a second tab that extends into the channel, and the second tab of the first plate may be engaged in a third slot of the actuator and the second tab of the second plate is engaged in a fourth slot of the actuator.

Alternatively or additionally to any of the examples above, in another example, the first and second slots may be a common slot and the third and fourth slots may be a common slot.

Alternatively or additionally to any of the examples above, in another example, the first tabs of the first and second plates may be configured to restrict movement of the bracket relative to the actuator in a first direction and the second tabs of the first and second plates may be configured to restrict movement of the bracket relative to the actuator in a second direction generally orthogonal to the first direction.

In another example, a bracket configured to mechanically couple an actuator with an actuator housing to an accessory component may include a U-shaped bracket comprising a first side and an opposing second side, with an interconnecting body connecting the first side and the second side. The first side may include one or more first tabs extending toward the second side. The second side may include one or more second tabs extending toward the first side. The interconnecting body may include one or more attachment features for attaching the bracket to the actuatable component.

Alternatively or additionally to any of the examples above, in another example, the first side may include two or more tabs extending toward the second side, where a first one of the two or more tabs of the first side may be configured to restrict movement of the bracket relative to the actuator housing in a first direction and a second one of the two or more tabs of the first side may be configured to restrict movement of the bracket relative to the actuator housing in a second direction generally orthogonal to the first direction.

Alternatively or additionally to any of the examples above, in another example, the one or more attachment features for securing the bracket to the actuatable component may include a hole extending through the interconnecting body of the bracket and/or a tang.

The present disclosure may be applied to any suitable actuator or actuatable valve assembly. For example, the present disclosure may be applied to any suitable HVAC actuatable valve assembly such as HVAC damper actuators used to actuate air dampers within air ducts, HVAC valve actuators used to actuate water valves within hydronic heating and/or cooling systems, and/or any other fluid or gas valves as desired. The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
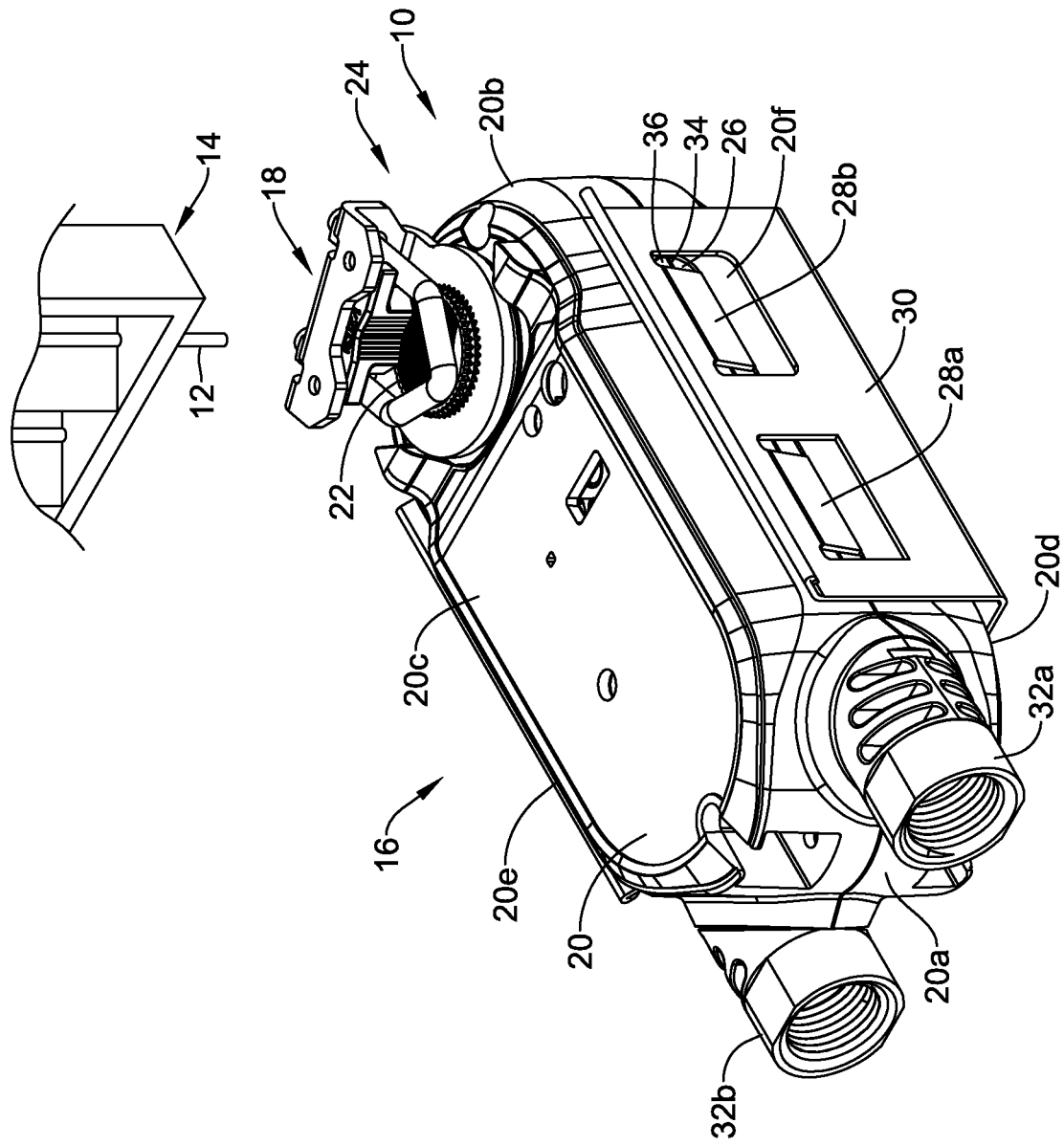
FIG. 1 is a perspective view of an illustrative but non-limiting bracket for mounting a valve actuator to drive a shaft of an actuatable valve.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

FIG. 1 is a perspective view of an illustrative but non-limiting valve actuator 10 for driving a valve shaft, such as a shaft 12 of an HVAC air damper 14. While FIG. 1 shows the valve actuator 10 driving a shaft 12 of an HVAC air damper 14 (not to scale), it is contemplated that the valve actuator may be used to drive any suitable valve shaft including but not limited to water valves within hydronic heating and/or cooling systems, other fluid or gas valves, and/or any other actuatable valve as desired. The term "valve" may encompass any actuatable valve such as air dampers, water valves, gas valves, ventilation flaps, louvers, and/or other actuatable valves that help regulate or control the flow of fluid in the HVAC system. More generally, it is contemplated that the actuator mounting assemblies disclosed herein may be used for mounting an actuator to drive any suitable rotating shaft, such as a rotating shaft of an HVAC or any other suitable actuatable component.

The illustrative valve actuator 10 includes an actuator 16 and an actuator mounting assembly 18. The actuator 16 includes a housing 20 that houses an electric motor (not shown) for rotating a drive member 22. In the example shown, the drive member 22 is a tubular structure that extends through the housing 20 and extends out of both the top and bottom sides of the housing as shown. Reference to "top" and "bottom" are made with respect to the orientation of FIG. 1 and are in no way limiting. Each end of the drive member 22 may have splines, grooves, teeth or other features that allow a shaft adapter 24 of the actuator mounting assembly 18 to engage the drive member 22 and transfer rotational movement from the drive member 22 to the valve shaft 12.

As shown, housing 20 may generally be a six-sided shape having a first end 20a, a second end 20b, a top 20c, a bottom 20d, a back (or first side) 20e and a front (or second side) 20f, as depicted in the view of FIG. 1. The terms top, bottom, back, front, left, right, first, and second are relative terms used merely to aid in discussing the drawings, and are not meant to be limiting in any manner.

In some cases, the actuator mounting assembly 18 may be secured to the valve shaft 12 without the actuator 16 present. This can make it easier to mount the actuator mounting assembly 18, especially in cramped spaces. In some cases, the actuator 16 may be wired where it is convenient, and then moved to the actuator mounting assembly 18 and secured to the mounted actuator mounting assembly 18, sometimes with a simple snap attachment. In some cases, a button, lever or other mechanism may release the actuator 16 from the actuator mounting assembly 18 for easy hand removal without the need for any tools. In some cases, a tool may be required to release the actuator from the actuator mounting assembly 18.

In some cases, the actuator 16 and actuator mounting assembly 18 are configured so that the actuator 16 may be mountable to the actuator mounting assembly 18 in two different orientations. In one orientation, the actuator 16 may rotate the valve shaft 12 via the actuator mounting assembly 18 in a clock-wise direction, and in the other orientation, the actuator 16 may rotate the valve shaft 12 in a counter-clock-wise direction. In the example shown in FIG. 1, the drive member 22 extends out of both the top and bottom sides of the housing 20, and each end of the drive member 22 may have splines, grooves, teeth or other features. This may allow the shaft adapter 24 of the actuator mounting assembly 18 to engage the drive member 22 in each of two orientations of the actuator 16. The drive direction of the valve shaft 12 can be changed by simply pushing the button, lever or other mechanism to release the actuator 16 from the actuator mounting assembly 18, re-orientate the actuator 16 (e.g., flipping the actuator 16 over), and then re-attaching the actuator 16 to the actuator mounting assembly 18. This can typically be easily accomplished even in cramped spaces. It is contemplated that the actuator housing 20 may have symmetric features to allow the actuator to be reversible in this way.

In the example shown, the actuator 16 may include conduit tubes or fittings 32a, 32b (collectively 32) extending from first end 20a thereof. While the actuator 16 is shown and described as including two conduit tubes 32, it is contemplated that the actuator 16 may include fewer than two conduit tubes 32 or more than two conduit tubes 32, as desired. In some cases, the actuator housing 20 may include a centrally located recess 26 positioned on both the back side 20e and the front side 20f of the housing 20. The recesses 26 may each define a channel 34 and a lip or protrusion 36. The recesses 26 may be configured to receive and/or engage one or more securement features 28a, 28b (collectively, 28) of a bracket 30, as will be described in more detail herein. In some instances, securement features 28 on the same side of the actuator housing 20 may be received within different portions of a common recess 26 or channel 34. While the recesses 26 are illustrated as defining a single channel 34 on either the front side 20f or the back side 20e of the actuator housing 20, it is contemplated that the recesses 26 may include more than one channel, as desired. For example, each securement feature 28 may be engaged with a separate and distinct recess 26 and/or separate and distinct protrusion 36.

In some embodiments, the securement features 28 may be configured to mechanically engage and/or form an interference connection with the recess(es) 26, channel(s) 34, and/or protrusion(s) 36, or other engagement features of the actuator housing 20. In a mechanical engagement, the securement features 28 may lock into the recess(es) 26, channel(s) 34, and/or protrusion(s) 36 but have a clearance (e.g., not in tension or applying pressure as in an interference connection) once the securement features 28 are engaged. It is contemplated that in such a mechanical engagement, the securement features 28 may be in tension when the actuator 16 is operating. The bracket 30 may be configured to be installed onto either side (e.g., top 20c or bottom 20d) of the actuator 16 to accommodate a reversible, or flippable, actuator 16. As will be described in more detail herein, the bracket 30 may be configured to accommodate and couple different accessory devices rather than just an actuator including, but not limited to, a crank arm mount, a reverse assembly, an external switch pack, a near-field communication (NFC) expansion module, a valve bracket, etc. When so provided, the bracket 30 may be considered a universal mounting bracket for mounting a family of compatible devices. In some instances, the bracket 30 may be installed and/or uninstalled without the use of tools. It is contemplated that the bracket 30 may be installed on a same side as the actuator mounting assembly 18 or on an opposite side, as required for a given installation.

Figure 2:
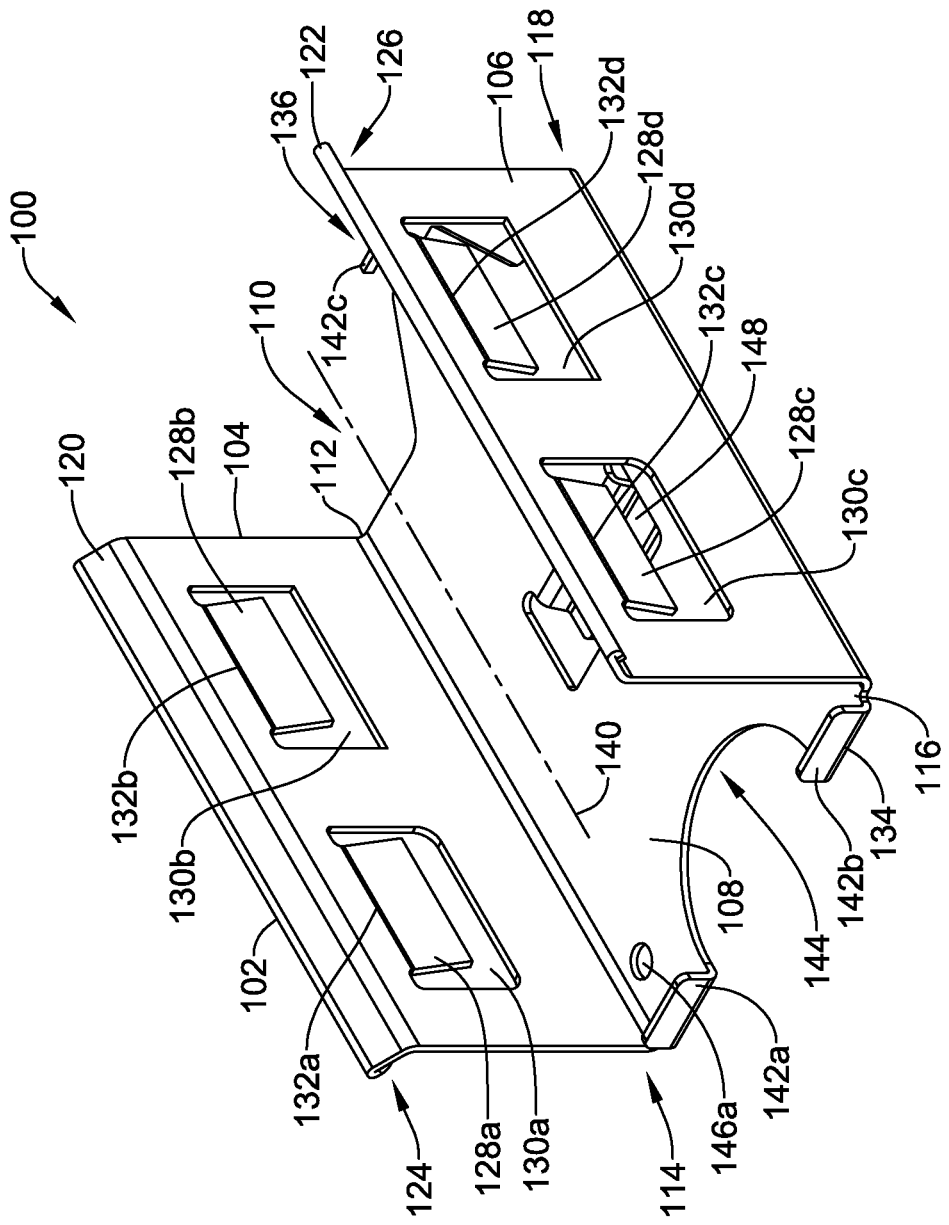
FIG. 2 is a perspective view of an illustrative but non-limiting bracket.
Figure 3:
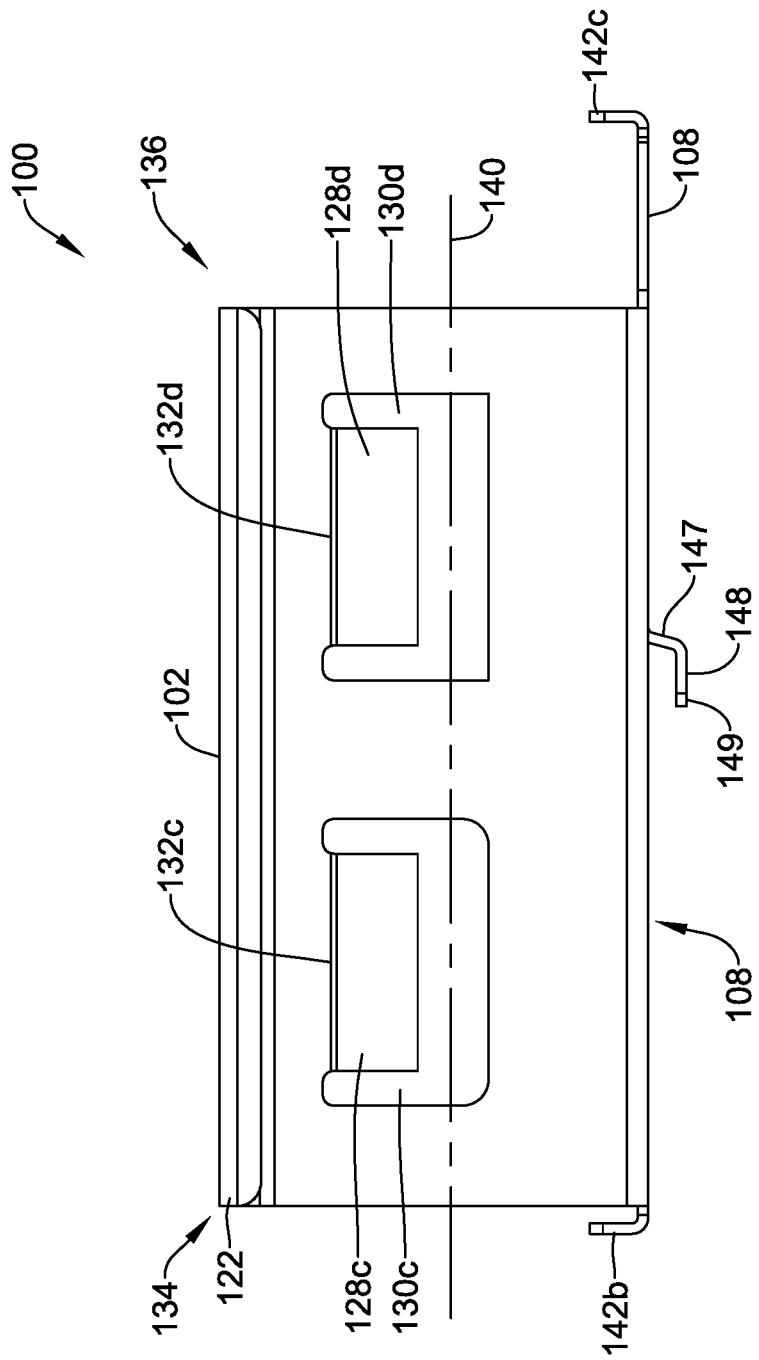
FIG. 3 is a side view of the illustrative bracket of FIG. 2.
Figure 4:
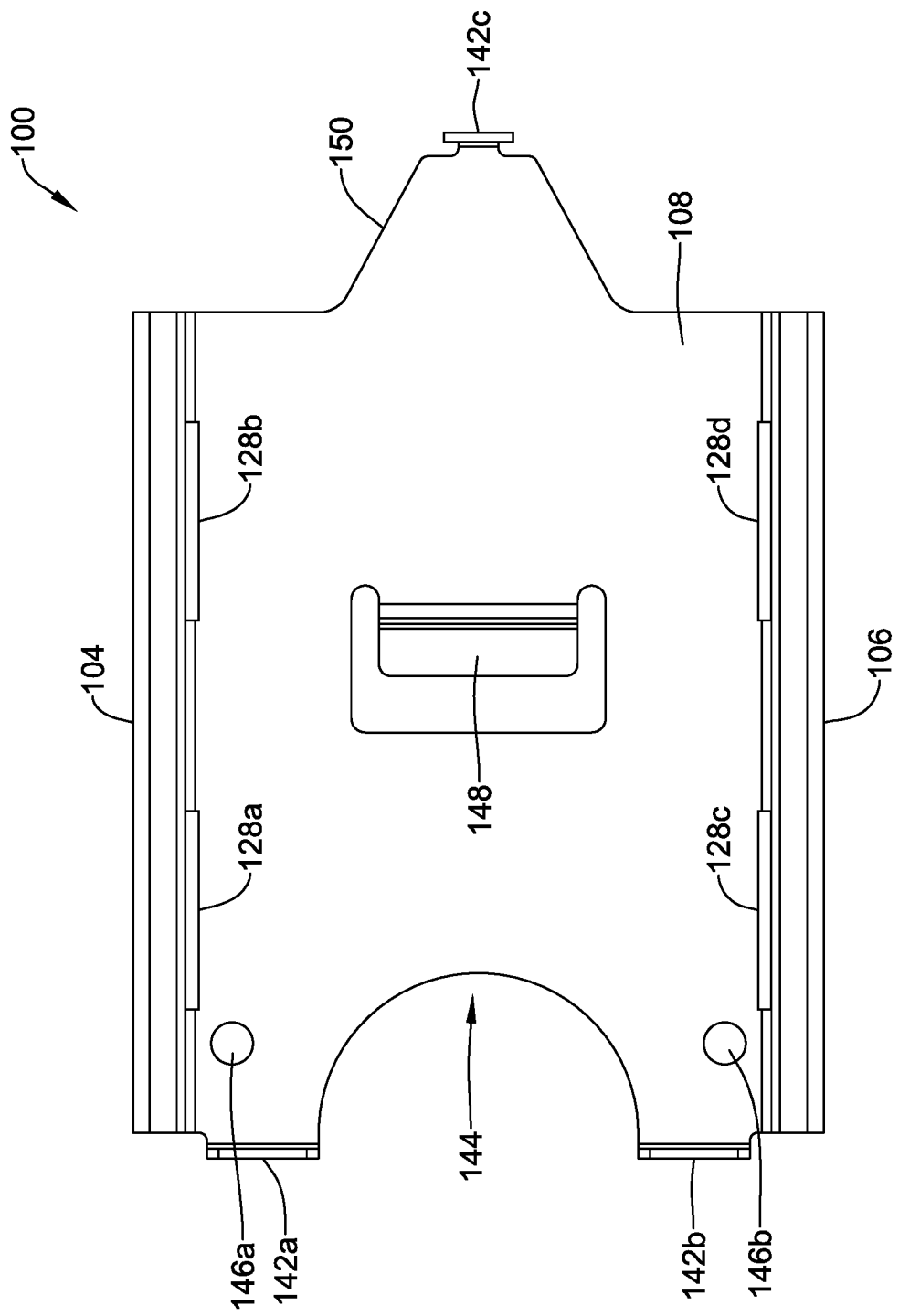
FIG. 4 is a top view of the illustrative bracket the FIG. 2.

Referring to FIG. 2 which is a perspective view of an illustrative bracket 100, FIG. 3 which illustrates a side view of the illustrative bracket 100, and FIG. 4 which illustrates a top view of the illustrative bracket 100. The illustrative bracket 100 may include a generally U-shaped body 102 having a first plate 104, a second plate 106, and a third plate 108. The third plate 108 may be positioned perpendicular to the first and second plates 104, 106, but this is not required. The third plate 108 may extend between the first plate 104 and the second plate 106 to define three sides of a U channel 110. In some instances, the first plate 104 may be coupled to or extend from a first lateral side 112 of the third plate 108 adjacent to a bottom end 114 of the first plate 104. It is further contemplated that the second plate 106 may be coupled to or extend from a second lateral side 116 of the third plate 108 adjacent to a bottom end 118 of the second plate 106. When the bracket 100 is secured relative to an actuator housing, at least part of the actuator housing may be disposed within the channel 110. In some embodiments, the bracket 100 may be formed as a unitary structure from stamped metal. In other embodiments, the bracket 100 may be formed from more than one piece coupled together, as desired. It is contemplated that the bracket 100 may be formed from a metal, a polymer, composites, or combinations thereof, as desired.

The first plate 104 and/or the second plate 106 may each include an outwardly extending flanges or angled portions 120, 122 adjacent to their respective top ends 124, 126, although this is not required. The flanges 120, 122 may extend from the first plate 104 and/or the second plate 106 at an angle away from the channel 110. It is contemplated that the flanges 120, 122 may provide a grip point for user to assemble the bracket 100 with an actuator 16 and/or to disassemble the bracket 100 from an actuator 16 without the use of tools. The flanges 120, 122 may also help initially align the actuator with the channel 110 when mounting the actuator to the bracket 100.

The body 102 of the bracket 100 may include one or more securement features 128a, 128b, 128c, 128d (collectively, 128) configured to mechanically engage and/or form an interference fit with one or more corresponding features on a side 20e, 20f of an actuator housing 20. For example, the securement features 128 may be tabs configured to engage a slot or recess, such as the slot 26 or channel 34 illustrated in FIG. 1. However, it is contemplated that the securement features 128 may be configured to engage other features of an actuator housing, such as, but not limited to slots, protrusions (such as the protrusions 36 illustrated in FIG. 1), grooves, etc. It is contemplated that some of the tabs (e.g., the tabs 128a, 128b in the first plate 104) may be configured to engage corresponding features on a first side 20e of the actuator housing 20 while some of the tabs (e.g., the tabs 128c, 128d in the second plate 106) may be configured to engage corresponding features on a second opposing side 20f of the actuator housing 20. The securement features or tabs 128 may be configured to bend when the tabs 128 are engaged with the engaging feature of the actuator housing. For example, the tabs 128 may extend a distance into the channel 110 that is greater than a depth of the engaging feature of the actuator housing such that the tabs 128 are deflected as the bracket is engaged with the actuator housing.

It should be noted that the bracket 100 may be reversible relative to the actuator housing 20. Thus, in some embodiments, the first plate 104 may be positioned along the back side 20e of the actuator housing 20, the second plate 106 may be positioned along the front side 20f of the actuator housing 20, and the third plate 108 may be positioned along the bottom 20d of the actuator housing. When the actuator housing 20 is flipped, the first plate 104 may be positioned along the front side 20f of the actuator housing 20, the second plate 106 may be positioned alongside the back side 20e of the actuator housing 20, and the third plate may be positioned along the top 20c of the actuator housing 20.

In some embodiments, the tabs 128 may be configured to extend from the first plate 104 and/or the second plate 106 and into the channel 110 such that they are configured to extend towards and engage a first and/or second side 20e, 20f of the actuator housing 20 disposed within the channel 110. The tabs 128 may be formed by removing some material from the first plate 104 and/or the second plate 106 to form one or more openings 130a, 130b, 130c, 130d (collectively, 130) in the body 102 of the bracket 100. In some instances, the openings 130 may be sized to allow the user to manipulate one or more of the securement features 128 with a finger or tool, if necessary.

It is contemplated that the tabs 128 may be configured to engage a mating feature on the actuator housing 20 to limit axial movement of the bracket 100. The direction of movement control may be selected through the orientation of the tabs 128. It is contemplated that the tabs 128 may be formed such that their attachment point 132a, 132b, 132c, 132d (collectively, 132) is the same or different as desired. For example, in the illustrative embodiment in FIG. 2, the attachment point 132 extends along an upper portion of the opening 130 such that a free end (e.g., the end opposite the attachment point 132) of the tabs 128 is angled towards the third plate 108. However, it is contemplated that the tabs 128 may be positioned such that the free end of the tabs are angled upwards or away from the third plate 108 while in other embodiments the free end of the tabs 128 may extend toward a first end 134 or a second end 136 of the bracket 100. It is further contemplated that the body 102 may include tabs 128 having any combination of tab orientations. For example, the tab orientation may be configured to limit movement of the bracket 100 relative to the actuator in a first direction parallel to a longitudinal axis 140 or a second direction generally orthogonal to the longitudinal axis 140. It is contemplated that a tab 128 oriented towards the third plate 108 or away from the third plate 108 may limit movement of the bracket 100 in a direction generally perpendicular to the longitudinal axis 140 while a tab 128 oriented towards the first or second ends 134, 136 of the bracket 100 may limit movement of the bracket 100 in a direction generally parallel to the longitudinal axis 140. Further, while the first plate 104 and the second plate 106 are collectively illustrated as including four securement features 128, it is contemplated that the first plate 104 and the second plate 106 may each include any number securement features 128 desired, including, but not limited to, one, two, three, four, or more. It is further contemplated that the first plate 104 and the second plate 106 need not include the same number of securement features 128.

The third plate 108 may also include motion limiting features 142a, 142b, 142c (collectively, 142) configured to limit movement of the bracket 100 relative to the actuator 16. In some embodiments, the motion limiting features 142 may be flanges extending generally perpendicular from the third plate 108 and into the channel 110. The flanges 142 may be configured to engage a first and/or a second end 20a, 20b of the actuator, as desired. In some embodiments, the third plate 108 of the bracket 100 may include a cutout or recess 144 adjacent to the first end 134 thereof. The cutout 144 may be sized and shaped such that a drive member, such as the drive member 22 illustrated in FIG. 1, may extend past the bracket 100 unhindered or without affecting its ability to rotate.

The body 102 of the bracket 100 may further include one or more attachment features 146a, 146b, 148 configured to attach the bracket 100 to an accessory component including, but not limited to, a valve, a crank arm mount, reverse assembly, external switch pack, near-field communication (NFC) expansion modules, etc. The attachment features 146a, 146b, 148 may be the same or different, as desired. For example, in some embodiments, the third plate 108 may include one or more holes or apertures 146a, 146b (collectively, 146) and/or one or more tangs 148. It is contemplated that the one or more holes 146 may be configured to receive a coupling mechanism such as, but not limited to, a screw, bolt, pin, etc. However, in other embodiments, the holes 146 may be configured to mechanically engage and/or form an interference connection with one or more corresponding features on an accessory component. It is contemplated that the third plate 108 may include any number of holes 146 desired, such as, but not limited to, one, two, three, four, or more. The tang 148 may extend from the third plate 108 in a direction away from the channel 110. In some instances, the tang 148 may have a bent or curved shape configured to mechanically engage and/or form an interference connection with one or more corresponding features on an accessory component. For example, as can be seen in FIG. 3, the tang 148 may have a first portion 147 extending generally orthogonal to the third plate 108 and a second portion 149 extending generally parallel to and spaced a distance from the third plate 108.

In some embodiments, the third plate 108 may include a tapered portion 150 extending beyond an end of the first and/or second plates 104, 106. The tapered portion 150 may have a width less than a width of the remainder of the third plate 108 and may be configured to generally align and/or conform with shape of a top or bottom surface 20c, 20d of the actuator housing 20 adjacent to the first end 20a thereof. In other embodiments, the tapered portion 150 may not be provided in the third plate 108 may have a length that is similar to the first and/or second plate 104, 106.

The bracket 100 may be configured to be snap-fit with actuator housing 20, or otherwise assembled without the use of tools. It is contemplated that the first and/or second side 104, 106 and/or the one or more securement features 128 may have some flexibility or resilience such that once the bracket 100 is assembled with the actuator housing 20, a snug or interference fit is provided between the bracket 100 and the actuator housing 20. Once assembled, the securement features 128, the motion limiting features 142, and/or the corresponding features (e.g., channels 26 and/or first or second ends 20a, 20b) may cooperate to securely couple the bracket 100 with the actuator housing 20 while limiting movement of the bracket 100 relative to the actuator housing 20 and the accessory component.

Figure 5:
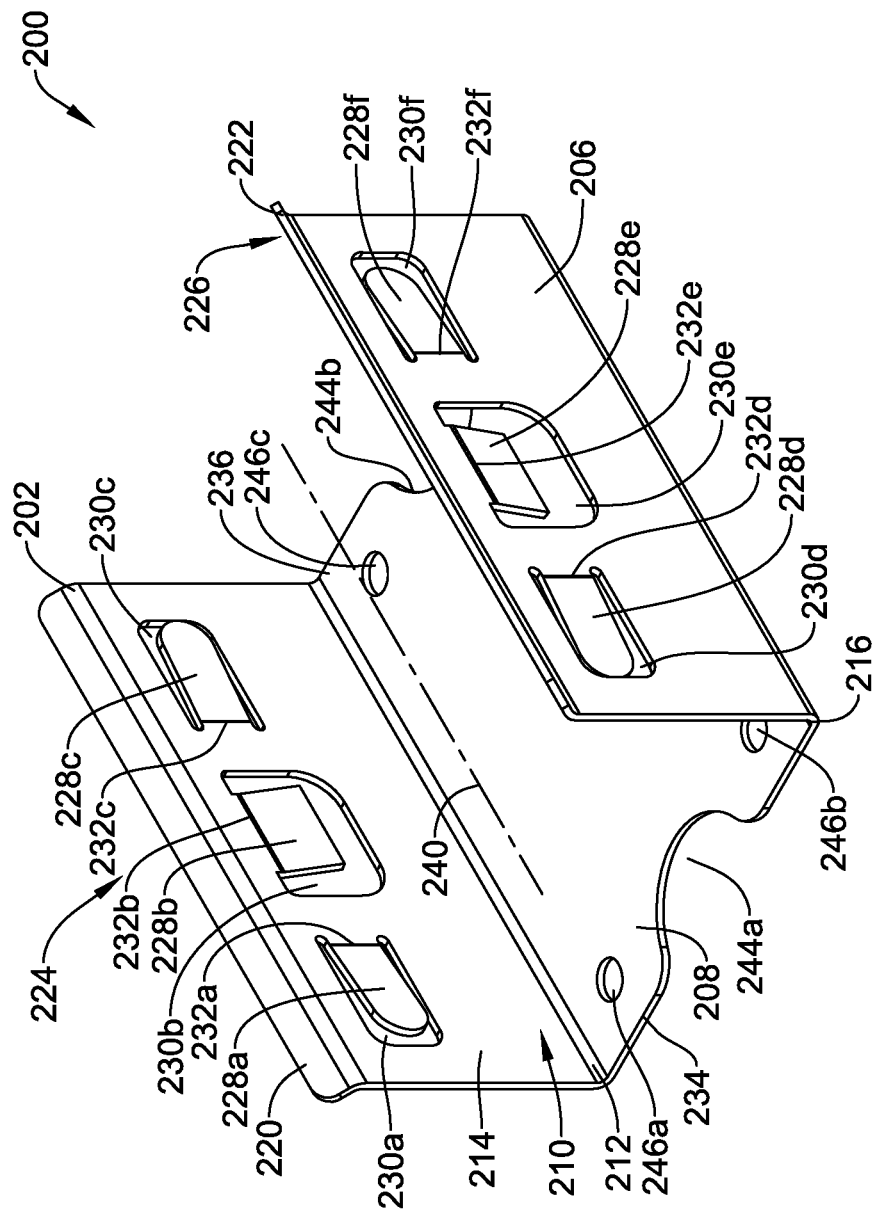
FIG. 5 is a perspective view of another illustrative bracket.
Figure 6:
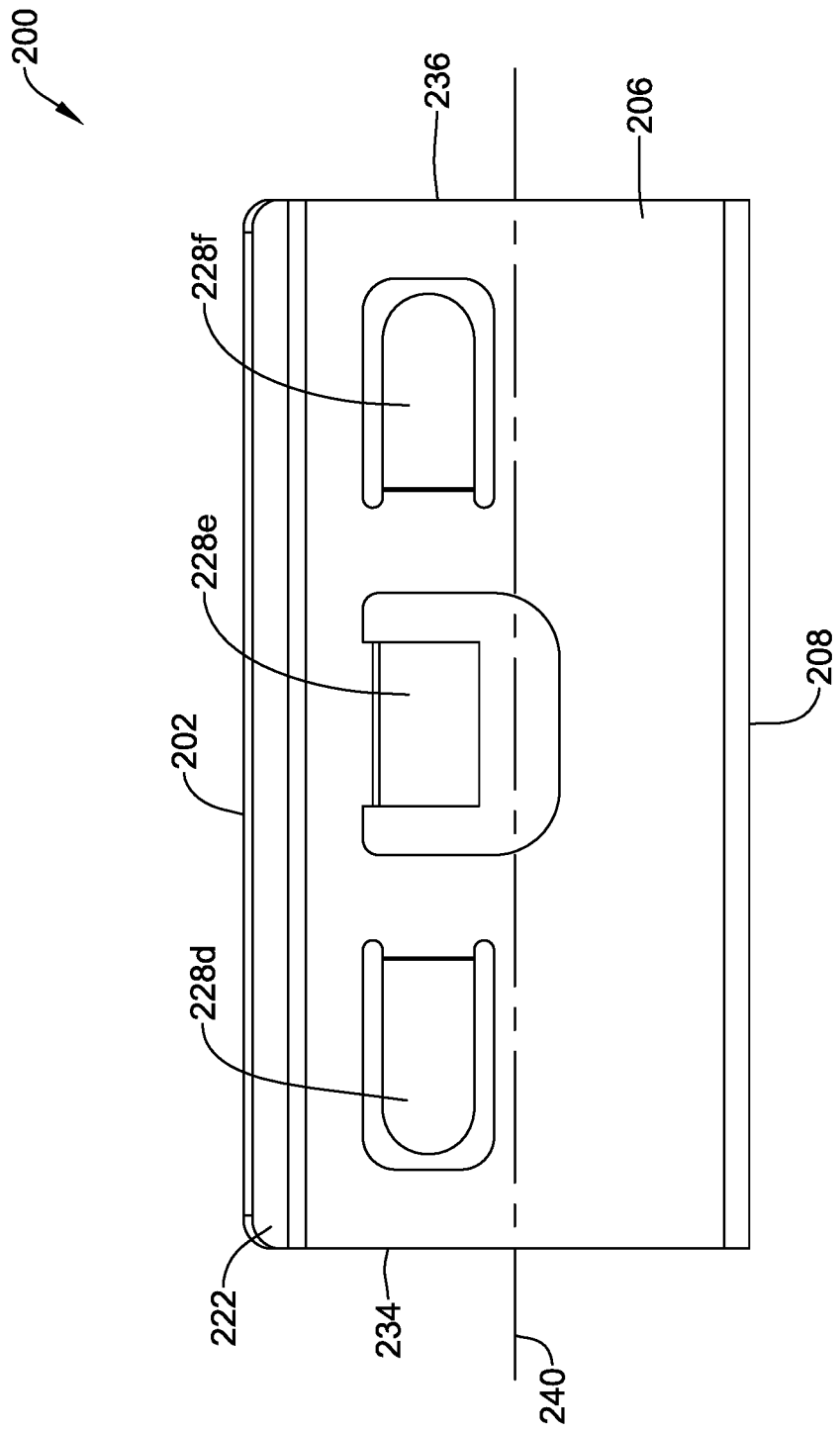
FIG. 6 is a side view of the illustrative bracket of FIG. 5.
Figure 7:
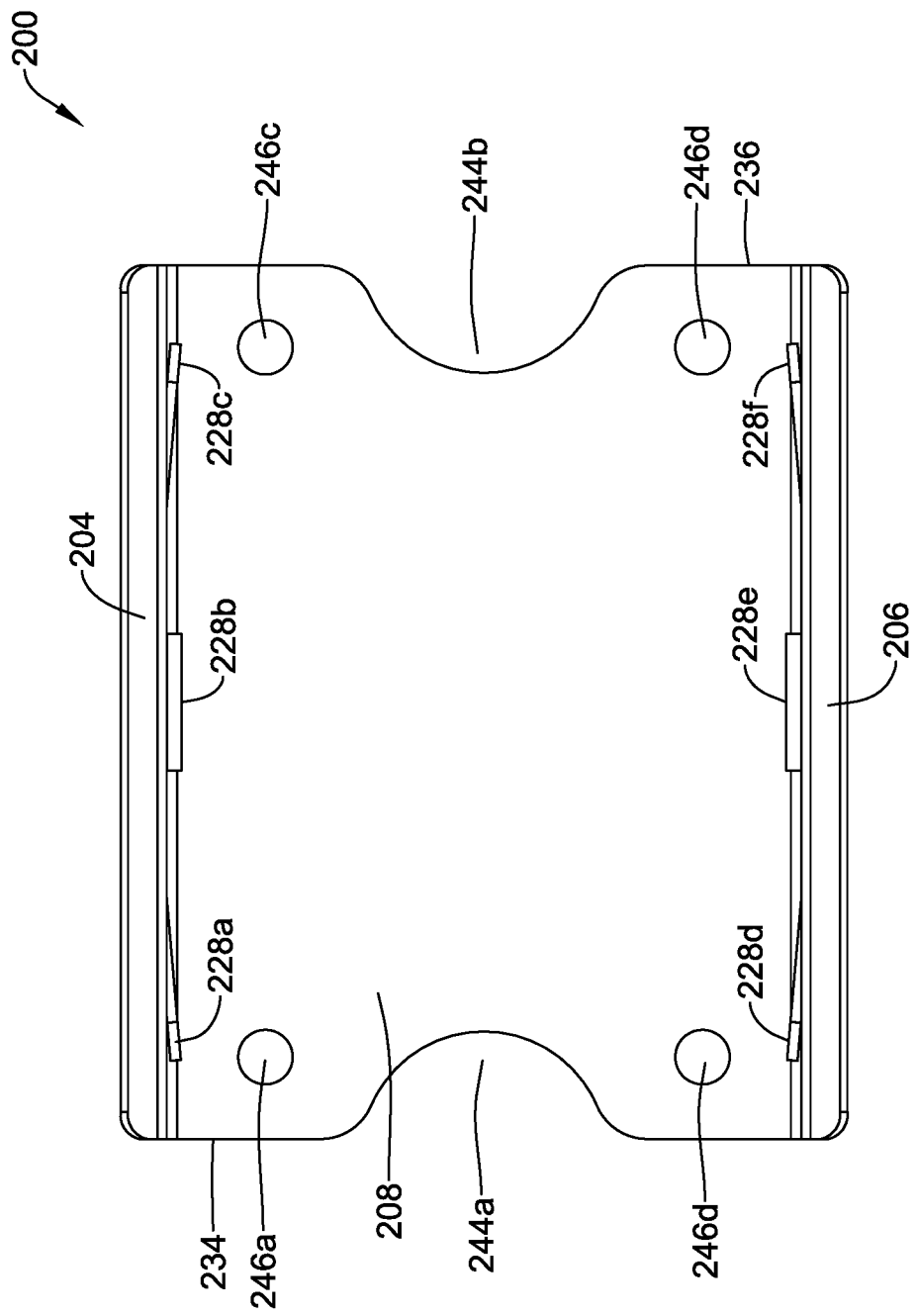
FIG. 7 is a top view of the illustrative bracket of FIG. 5.

Referring to FIG. 5 which is a perspective view of another illustrative bracket 200, FIG. 6 which illustrates a side view of the illustrative bracket 200, and FIG. 7 which illustrates a top view of the illustrative bracket 200. The bracket 200 may include a generally U-shaped body 202 having a first plate 204, a second plate 206, and a third plate 208. The third plate 208 may be positioned perpendicular to the first and second plates 204, 206, but this is not required. The third plate 208 may extend between the first plate 204 and the second plate 206 to define three sides of a channel 210. In some instances, the first plate 204 may be coupled to or extend from a first lateral side 212 of the third plate 208 adjacent to a bottom end 214 of the first plate 204. It is further contemplated that the second plate 206 may be coupled to or extend from a second lateral side 216 of the third plate 208 adjacent to a bottom end 218 of the second plate 206. When the bracket 200 is secured relative to an actuator housing, at least part of the actuator housing may be disposed within the channel 210. In some embodiments, the bracket 200 may be formed as a unitary structure from stamped metal. In other embodiments, the bracket 200 may be formed from more two or more components that are coupled together, as desired. It is contemplated that the bracket 200 may be formed from a metal, a polymer, composites, or combinations thereof, as desired.

The first plate 204 and/or the second plate 206 may each include an outwardly extending flanges or angled portions 220, 222 adjacent to their respective top ends 224, 226, although this is not required. The flanges 220, 222 may extend from the first plate 204 and/or the second plate 206 at an angle away from the channel 210. It is contemplated that the flanges 220, 222 may provide a grip point for user to assemble the bracket 200 with an actuator 16 and/or to disassemble the bracket 200 from an actuator 16 without the use of tools. The flanges 220, 222 may also help initially align the actuator with the channel 210 when mounting the actuator to the bracket 200.

The body 202 of the bracket 200 may include one or more securement features 228a, 228b, 228c, 228d, 228e, 228f (collectively, 228) configured to mechanically engage and/or form an interference fit with one or more corresponding features on a side 20e, 20f of an actuator housing 20. For example, the securement features 228 may include tabs configured to engage a slot or recess, such as the slot 26 or channel 34 illustrated in FIG. 1. However, it is contemplated that the securement features 228 may be configured to engage other features of an actuator housing, such as, but not limited to slots, protrusions (such as the protrusions 36 illustrated in FIG. 1), grooves, etc. It is contemplated that some of the tabs (e.g., the tabs 228a, 228b, 228c in the first plate 204) may be configured to engage corresponding features on a first side 20e of the actuator housing 20 while some of the tabs (e.g., the tabs 228d, 228e, 228f in the second plate 206) may be configured to engage corresponding features on a second opposing side 20f of the actuator housing 20. The securement features or tabs 228 may be configured to bend or flex when the tabs 228 are engaged with the engaging feature of the actuator housing. For example, the tabs 228 may extend a distance into the channel 210 that is greater than a depth of the engaging feature of the actuator housing such that the tabs 228 are deflected as the bracket is engaged with the actuator housing.

It should be noted that the bracket 200 may be reversible relative to the actuator housing 20. Thus, in some embodiments, the first plate 204 may be positioned along the back side 20e of the actuator housing 20, the second plate 206 may be positioned along the front side 20f of the actuator housing 20, and the third plate 208 may be positioned along the bottom 20d of the actuator housing. When the actuator housing 20 is flipped over, the first plate 204 may be positioned along the front side 20f of the actuator housing 20, the second plate 206 may be positioned alongside the back side 20e of the actuator housing 20, and the third plate may be positioned along the top 20c of the actuator housing 20.

In some embodiments, the tabs 228 may be configured to extend from the first plate 204 and/or the second plate 206 and into the channel 210 such that they are configured to extend towards and engage a first and/or second side 20e, 20f of the actuator housing 20 disposed within the channel 210. The tabs 228 may be formed by removing some material from the first plate 204 and/or the second plate 206 to form one or more openings 230a, 230b, 230c, 230d, 230e, 230f (collectively, 230) in the body 202 of the bracket 200.

In some instances, the openings 230 may be sized to allow the user to manipulate one or more of the securement features 228 with a finger or tool, if necessary.

It is contemplated that the tabs 228 may be configured to engage a mating feature on the actuator housing 20 to limit axial movement of the bracket 200. The direction of movement control may be selected through the orientation of the tabs 228. It is contemplated that the tabs 228 may be formed such that their attachment point 232a, 232b, 232c, 232d, 232e, 232f (collectively, 232) is the same or different as desired. For example, in the illustrative embodiment in FIG. 5, the attachment points 232b, 232e extends along an upper portion of the opening 230b, 230e such that a free end (e.g., the end opposite the attachment point 232) of the tabs 228b, 228e is angled towards the third plate 208. Other attachment points 232a, 232d extend along a second side of the opening 230a, 230d such that a free end (e.g., the end opposite the attachment point 232) of the tabs 228a, 228d is angled towards the first end 234 of the bracket 200. Yet other attachment points 232c, 232f extend along a first side of the opening 230c, 230f such that a free end (e.g., the end opposite the attachment point 232) of the tabs 228c, 228f is angled towards the second end 236 of the bracket 200. However, it is contemplated that the tabs 228 may be positioned such that the free end of the tabs are angled upwards or away from the third plate 208.

It is further contemplated that the body 202 may include tabs 228 having any combination of tab orientations. For example, the tab orientation of tabs 228a, 228d may be configured to limit movement of the bracket 200 relative to the actuator in a first direction parallel to a longitudinal axis 240, the tab orientation of tabs 228c, 228f may be configured to limit movement of the bracket 200 relative to the actuator in a second direction (opposite to the first direction) also parallel to the longitudinal axis 240, and the tab orientation of tabs 228b, 228e may be configured to limit movement of the bracket 200 in a third direction generally orthogonal to the longitudinal axis 240. It is contemplated that a tab 228 oriented towards the third plate 208 or away from the third plate 208 may limit movement of the bracket 200 in a direction generally perpendicular to the longitudinal axis 240 while a tab 228 oriented towards the first or second ends 234, 236 of the bracket 200 may limit movement of the bracket 200 in a direction generally parallel to the longitudinal axis 240. Further, while the first plate 204 and the second plate 206 are collectively illustrated as including six securement features 228, it is contemplated that the first plate 204 and the second plate 206 may each include any number securement features 228 desired, including, but not limited to, one, two, three, four, or more. It is further contemplated that the first plate 204 and the second plate 206 need not include the same number of securement features 228.

While not explicitly shown, the third plate 208 may also include motion limiting features configured to limit movement of the bracket 200 relative to the actuator 16 similar in form and function to the motion limiting features described herein. In some embodiments, the third plate 208 of the bracket 200 may include one or more cutouts or recesses 244a, 244b (collectively, 244). The cutouts 244 may be sized and shaped such that a drive member, such as the drive member 22 illustrated in FIG. 1, may extend past the bracket 200 unhindered or without affecting its ability to rotate.

The body 202 of the bracket 200 may further include one or more attachment features 246a, 246b, 246c, 246d configured to attach the bracket 200 to an accessory component including, but not limited to, a valve, a crank arm mount, a reverse assembly, an external switch pack, a near-field communication (NFC) expansion modules, etc. When so provided, the bracket 30 may be considered a universal mounting bracket for mounting a family of compatible devices. The attachment features 246a, 246b, 246c, 246d may be the same or different, as desired. For example, in some embodiments, the third plate 208 may include one or more holes or apertures 246. It is contemplated that the one or more holes 246 may be configured to receive a coupling mechanism such as, but not limited to, a screw, bolt, pin, etc. However, in other embodiments, the holes 246 may be configured to mechanically engage and/or form an interference connection with one or more corresponding features on an accessory component. It is contemplated that the third plate 108 may include any number of holes 246 desired, such as, but not limited to, one, two, three, four, or more. While not explicitly shown, the bracket may include a tang extending from the third plate 208 in a direction away from the channel 210.

The bracket 200 may be configured to be snap-fit within actuator housing 20, or otherwise assembled without the use of tools. It is contemplated that the first and/or second side 204, 206 and/or the one or more securement features 228 may have some flexibility or resilience such that once the bracket 200 is assembled with the actuator housing 20 a snug or interference fit is provided between the bracket 200 and the actuator housing 20. Once assembled, the securement features 228, other motion limiting features, and/or the corresponding features (e.g., channels 26 and/or first or second ends 20a, 20b) may cooperate to securely couple the bracket 200 with the actuator housing 20 while limiting movement of the bracket 200 relative to the actuator housing 20.

Figure 8:
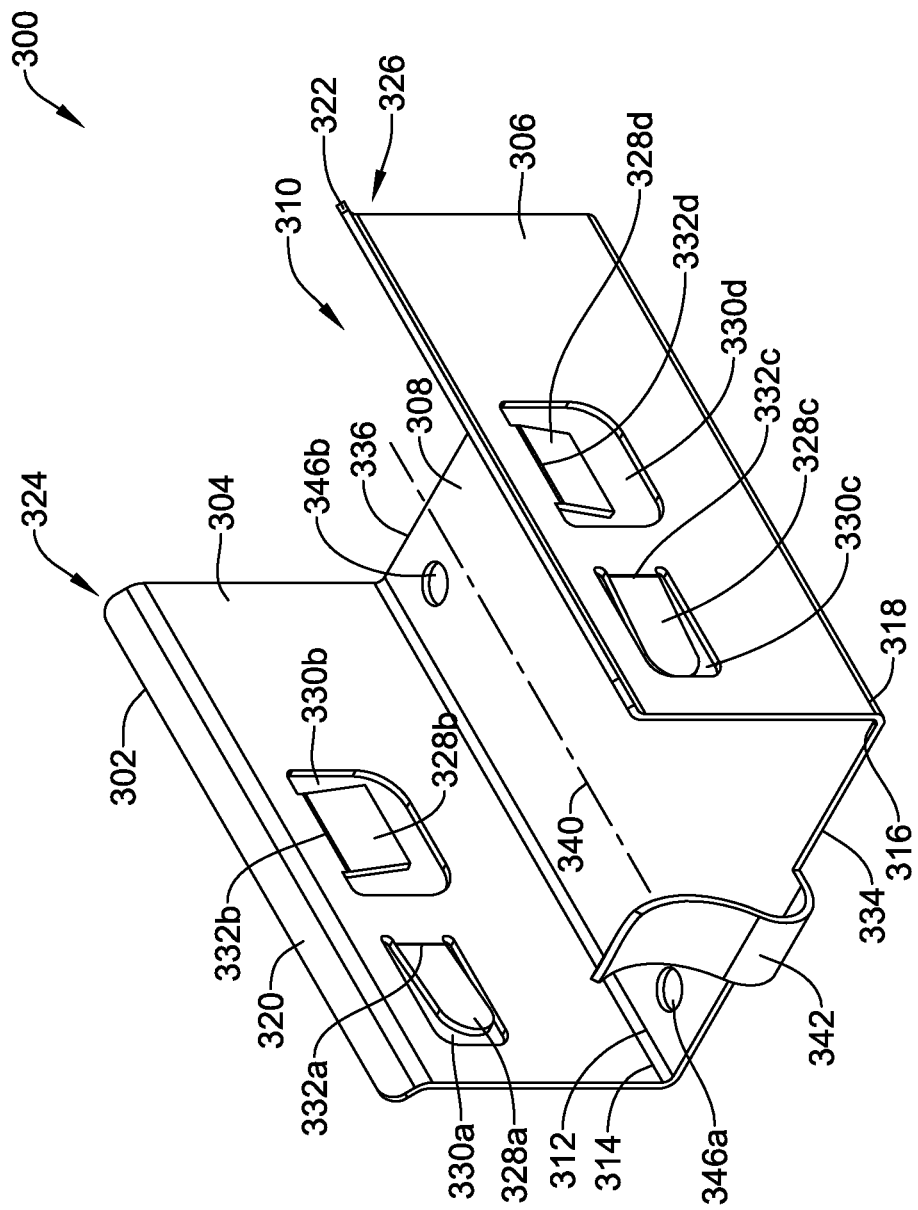
FIG. 8 is a perspective view of another illustrative bracket.
Figure 9:
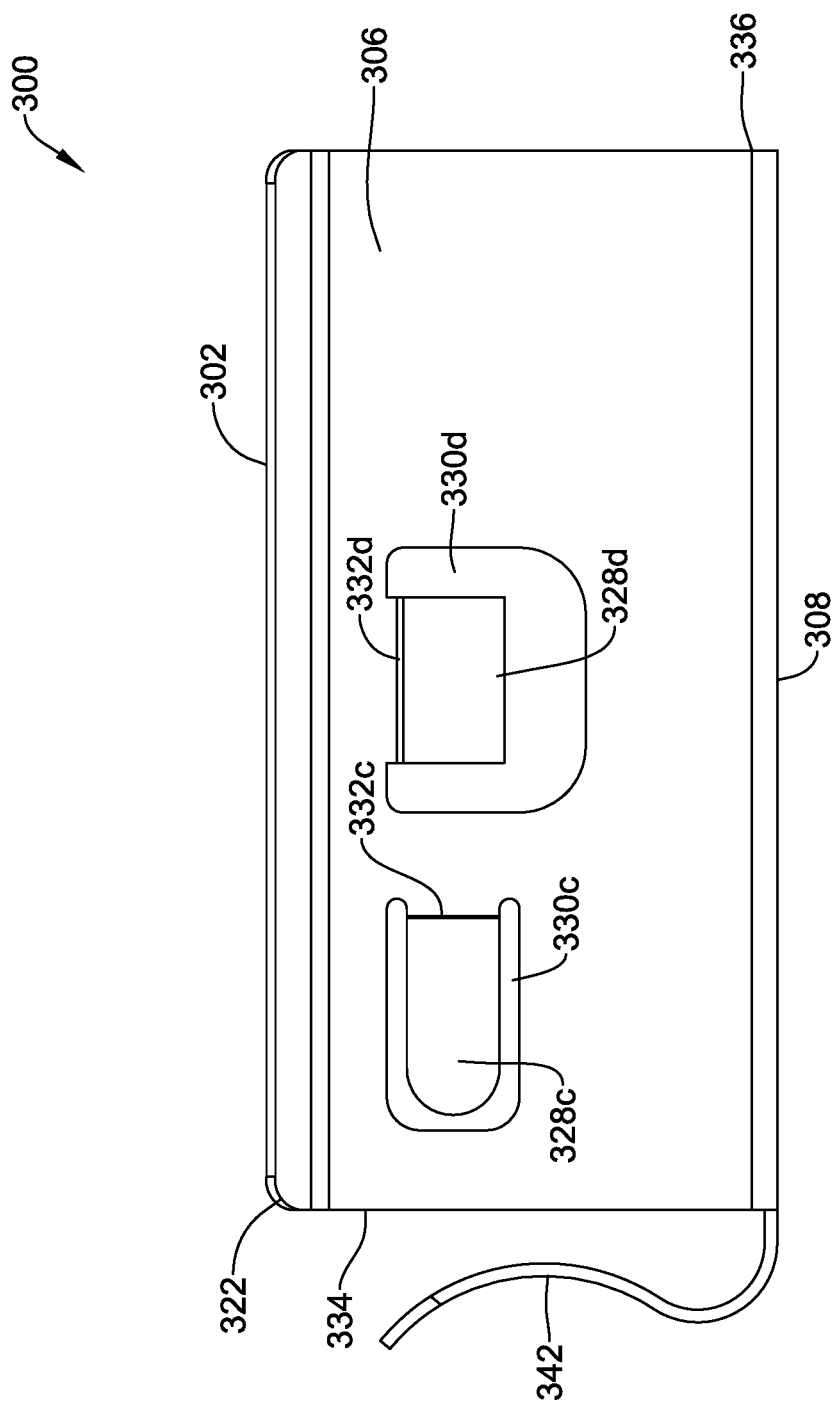
FIG. 9 is a side view of the illustrative bracket the FIG. 8.

Referring to FIG. 8 which is a perspective view of another illustrative bracket 30 and FIG. 9 which illustrates a side view of the illustrative bracket 300. The bracket 300 may include a generally U-shaped body 302 having a first plate 304, a second plate 306, and a third plate 308. The third plate 308 may be positioned perpendicular to the first and second plates 304, 306, but this is not required. The third plate 308 may extend between the first plate 304 and the second plate 306 to define three sides of a channel 310. In some instances, the first plate 304 may be coupled to or extend from a first lateral side 312 of the third plate 308 adjacent to a bottom end 314 of the first plate 304. It is further contemplated that the second plate 306 may be coupled to or extend from a second lateral side 316 of the third plate 308 adjacent to a bottom end 318 of the second plate 306. When the bracket 300 is secured relative to an actuator housing, the actuator housing may be disposed within the channel 310. In some embodiments, the bracket 300 may be formed as a unitary structure from stamped metal. In other embodiments, the bracket 300 may be formed from more than one piece coupled together, as desired. It is contemplated that the bracket 300 may be formed from a metal, a polymer, composites, or combinations thereof, as desired.

The first plate 304 and/or the second plate 306 may each include an outwardly extending flanges or angled portions 320, 322 adjacent to their respective top ends 324, 326, although this is not required. The flanges 320, 322 may extend from the first plate 304 and/or the second plate 306 at an angle away from the channel 310. It is contemplated that the flanges 320, 322 may provide a grip point for user to assemble the bracket 300 with an actuator 16 and/or to disassemble the bracket 300 from an actuator 16 without the use of tools. The flanges 320, 322 may also help initially align the actuator with the channel 310 when mounting the actuator to the bracket 100.

The body 302 of the bracket 300 may include one or more securement features 328a, 328b, 328c, 328d (collectively, 328) configured to mechanically engage and/or form an interference fit with one or more corresponding features on a side 20e, 20f of an actuator housing 20. For example, the securement features 328 may be tabs configured to engage a slot or recess, such as the slot 26 or channel 34 illustrated in FIG. 1. However, it is contemplated that the securement features 328 may be configured to engage other features of an actuator housing, such as, but not limited to slots, protrusions (such as the protrusions 36 illustrated in FIG. 1), grooves, etc. It is contemplated that some of the tabs (e.g., the tabs 328a, 328b in the first plate 304) may be configured to engage corresponding features on a first side 20e of the actuator housing 20 while some of the tabs (e.g., the tabs 328c, 328d in the second plate 306) may be configured to engage corresponding features on a second opposing side 20f of the actuator housing 20. The securement features or tabs 328 may be configured to bend when the tabs 328 are engaged with the engaging feature of the actuator housing. For example, the tabs 328 may extend a distance into the channel 310 that is greater than a depth of the engaging feature of the actuator housing such that the tabs 328 are deflected as the bracket is engaged with the actuator housing.

It should be noted that the bracket 300 may be reversible relative to the actuator housing 20. Thus, in some embodiments, the first plate 304 may be positioned along the back side 20e of the actuator housing 20, the second plate 306 may be positioned along the front side 20f of the actuator housing 20, and the third plate 308 may be positioned along the bottom 20d of the actuator housing. When the actuator housing 20 is flipped over, the first plate 304 may be positioned along the front side 20f of the actuator housing 20, the second plate 306 may be positioned alongside the back side 20e of the actuator housing 20, and the third plate may be positioned along the top 20c of the actuator housing 20.

In some embodiments, the tabs 328 may be configured to extend from the first plate 304 and/or the second plate 306 and into the channel 310 such that they are configured to extend towards and engage a first and/or second side 20e, 20f of the actuator housing 20 disposed within the channel 310. The tabs 328 may be formed by removing some material from the first plate 304 and/or the second plate 306 to form one or more openings 330a, 330b, 330c, 330d (collectively, 330) in the body 302 of the bracket 300. In some instances, the openings 330 may be sized to allow the user to manipulate one or more of the securement features 328 with a finger or tool, if necessary.

It is contemplated that the tabs 328 may be configured to engage a mating feature on the actuator housing 20 to limit axial movement of the bracket 300. The direction of movement control may be selected through the orientation of the tabs 328. It is contemplated that the tabs 328 may be formed such that their attachment point 332a, 332b, 332c, 332d (collectively, 332) is the same or different as desired. For example, in the illustrative embodiment in FIG. 8, some of the attachment points 332b, 332d extend along an upper portion of the opening 330b, 330d such that a free end (e.g., the end opposite the attachment point 332) of the tabs 328 is angled towards the third plate 308. Other attachment points 332a, 332c extend along a second side of the opening 330a, 330c such that a free end (e.g., the end opposite the attachment point 332) of the tabs 328a, 328c is angled towards the first end 334 of the bracket 300.

However, it is contemplated that the tabs 328 may be positioned such that the free end of the tabs are angled upwards or away from the third plate 308 while in other embodiments the free end of the tabs 328 may extend toward a first end 334 or a second end 336 of the bracket 300. It is further contemplated that the body 302 may include tabs 328 having any combination of tab orientations. For example, the tab orientation may be configured to limit movement of the bracket 300 relative to the actuator in a first direction parallel to a longitudinal axis 340 or a second direction generally orthogonal to the longitudinal axis 340. It is contemplated that a tab 328 oriented towards the third plate 308 or away from the third plate 308 may limit movement of the bracket 300 in a direction generally perpendicular to the longitudinal axis 340 while a tab 328 oriented towards the first or second ends 334, 336 of the bracket 300 may limit movement of the bracket 300 in a direction generally parallel to the longitudinal axis 340. Further, while the first plate 304 and the second plate 306 are collectively illustrated as including four securement features 328, it is contemplated that the first plate 304 and the second plate 306 may each include any number securement features 328 desired, including, but not limited to, one, two, three, four, or more. It is further contemplated that the first plate 304 and the second plate 306 need not include the same number of securement features 328.

The third plate 308 may also include one or more motion limiting features 342 configured to limit movement of the bracket 300 relative to the actuator 16. In some embodiments, the motion limiting feature 342 may be a resilient clip or lever extending generally perpendicular from the third plate 308 and into the channel 310. The clip 342 may be configured to engage a first and/or a second end 20a, 20b of the actuator, as desired. The clip 342 may be flexible or resilient to facilitate coupling or uncoupling of the bracket 300 with the actuator housing 20.

The body 302 of the bracket 300 may further include one or more attachment features 346a, 346b configured to attach the bracket 300 to an accessory component including, but not limited to, a valve, a crank arm mount, a reverse assembly, an external switch pack, a near-field communication (NFC) expansion module, etc. The attachment features 346a, 346b may be the same or different, as desired. For example, in some embodiments, the third plate 308 may include one or more holes or apertures 346a, 346b (collectively, 346). It is contemplated that the one or more holes 346 may be configured to receive a coupling mechanism such as, but not limited to, a screw, bolt, pin, etc. However, in other embodiments, the holes 346 may be configured to mechanically engage and/or form an interference connection with one or more corresponding features on an accessory component. While not explicitly shown, the bracket may include a tang extending from the third plate 308 in a direction away from the channel 310.

The bracket 300 may be configured to be snap-fit within actuator housing 20, or otherwise assembled without the use of tools. It is contemplated that the first and/or second side 304, 306 and/or the one or more securement features 328 may have some flexibility or resilience such that once the bracket 300 is assembled with the actuator housing 20 a snug or interference fit is provided between the bracket 300 and the actuator housing 20. Once assembled, the securement features 328, the motion limiting features 342, and/or the corresponding features (e.g., channels 26 and/or first or second ends 20a, 20b) may cooperate to securely couple the bracket 300 with the actuator housing 20 while limiting movement of the bracket 300 relative to the actuator housing 20.

Figure 10:
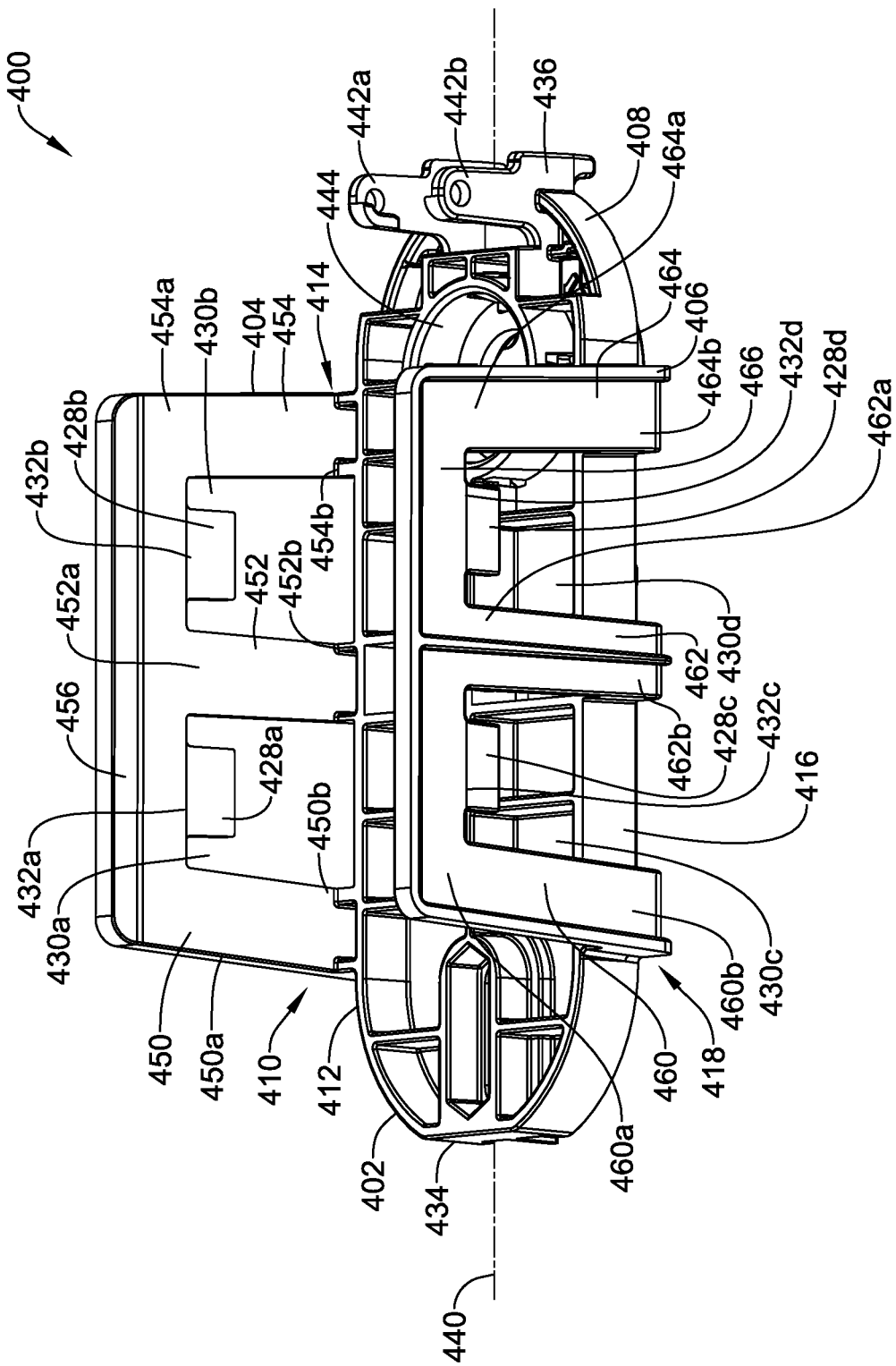
FIG. 10 is a perspective view of another illustrative bracket.
Figure 11:
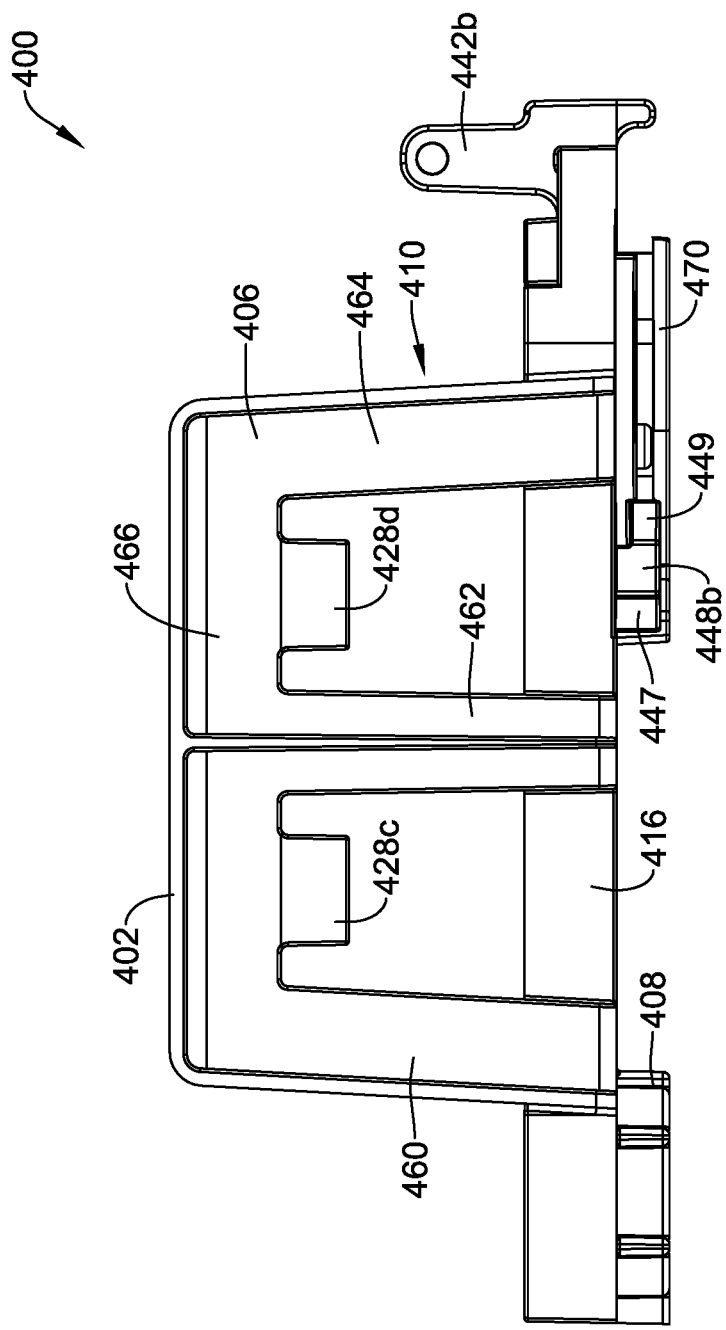
FIG. 11 is a side view of the illustrative bracket the FIG. 10.
Figure 12:
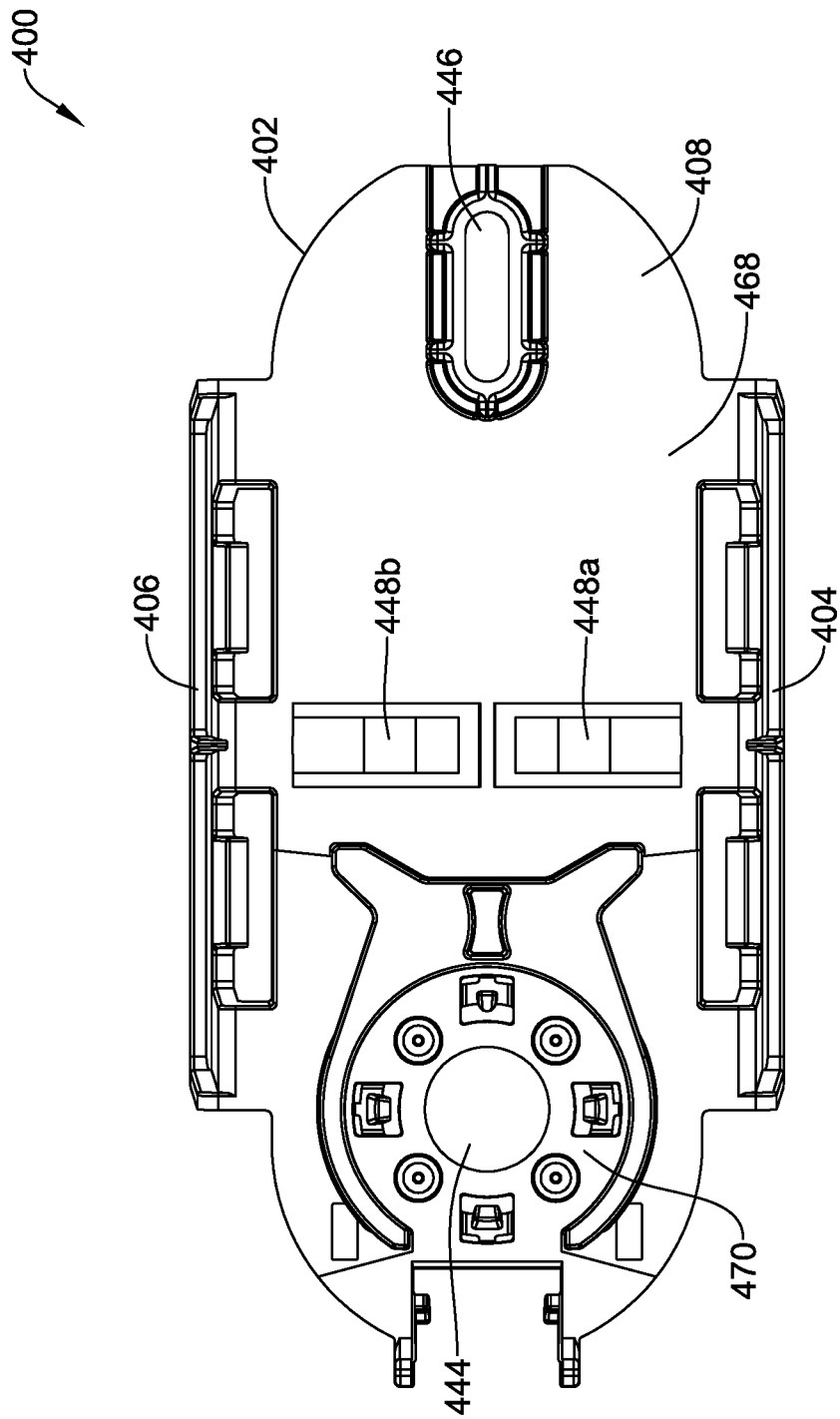
FIG. 12 is a bottom view of an illustrative bracket of FIG. 10.

Referring to FIG. 10 which is a perspective view of another illustrative bracket 400, FIG. 11 which illustrates a side view of the illustrative bracket 400, and FIG. 12 which illustrates a bottom view of the illustrative bracket 400. The bracket 400 may include a generally U-shaped body 402 having a first arm or plate 404, a second arm or plate 406, and a platform or third plate 408. The third plate 408 may be positioned perpendicular to the first and second plates 404, 406, but this is not required. The third plate 408 may extend between the first plate 404 and the second plate 406 to generally define three sides of a channel 410. In some instances, the first plate 404 may be coupled to or extend from a first lateral side 412 of the third plate 408 adjacent to a bottom end 414 of the first plate 404. It is further contemplated that the second plate 406 may be coupled to or extend from a second lateral side 416 of the third plate 408 adjacent to a bottom end 418 of the second plate 406. When the bracket 400 is secured relative to an actuator housing, the actuator housing may be disposed within the channel 410. In some embodiments, the bracket 400 may be formed as a unitary structure from a molded plastic or polymer. In other embodiments, the bracket 400 may be formed from more than one piece coupled together, as desired. It is contemplated that the bracket 400 may be formed from a metal, a polymer, composites, or combinations thereof, as desired.

The first plate 404 and/or the second plate 406 may each have a generally "W" shape. The first plate or arm 404 may include a first member 450, a second member 452, and a third member 454. Each of the first, second, and third members 450, 452, 454 may each have a bottom end 450b, 452b, 454b coupled to the first lateral side 412 of the platform 408. Each of the first, second, and third members 450, 452, 454 may extend from the bottom ends 450b, 452b, 454b to a top end 450a, 452a, 454a coupled to a bridge 456 interconnecting the three members 450, 452, 454. Similarly, the second plate or arm 406 may include a first member 460, a second member 462, and a third member 464. Each of the first, second, and third members 460, 462, 464 may each have a bottom end 460b, 462b, 464b coupled to the second lateral side 416 of the platform 408. Each of the first, second, and third members 460, 462, 464 may extend from the bottom ends 460b, 462b, 464b to a top end 460a, 462a, 464a coupled to a bridge 466 interconnecting the three members 460, 462, 464.

The body 402 of the bracket 400 may include one or more securement features 428a, 428b, 428c, 428d (collectively, 428) configured to mechanically engage and/or form an interference fit with one or more corresponding features on a side 20e, 20f of an actuator housing 20. For example, the securement features 428 may be tabs configured to engage a slot or recess, such as the slot 26 or channel 34 illustrated in FIG. 1. However, it is contemplated that the securement features 428 may be configured to engage other features of an actuator housing, such as, but not limited to slots, protrusions (such as the protrusions 36 illustrated in FIG. 1), grooves, etc. The first arm 404 may include a first tab 428a extending downward and towards the channel 410 from the bridge 456 between the first member 450 and the second member 452 and a second tab 428b extending downward and towards the channel 410 from the bridge 456 between the second member 452 and the third member 454. The second arm 406 may include a first tab 428c extending downward and towards the channel 410 from the bridge 466 between the first member 460 and the second member 462 and a second tab 428d extending downward and towards the channel 410 from the bridge 466 between the second member 462 and the third member 464.

It is contemplated that some of the tabs (e.g., the tabs 428a, 428b in the first plate 404) may be configured to engage corresponding features on a first side 20e of the actuator housing 20 while some of the tabs (e.g., the tabs 428c, 428d in the second plate 406) may be configured to engage corresponding features on a second opposing side 20f of the actuator housing 20. The securement features or tabs 428 may be configured to bend when the tabs 428 are engaged with the engaging feature of the actuator housing. For example, the tabs 428 may extend a distance into the channel 410 that is greater than a depth of the engaging feature of the actuator housing such that the tabs 428 are deflected as the bracket is engaged with the actuator housing.

It should be noted that the bracket 400 may be reversible relative to the actuator housing 20. Thus, in some embodiments, the first plate 404 may be positioned along the back side 20e of the actuator housing 20, the second plate 406 may be positioned along the front side 20f of the actuator housing 20, and the third plate 408 may be positioned along the bottom 20d of the actuator housing. When the actuator housing 20 is flipped over, the first plate 404 may be positioned along the front side 20f of the actuator housing 20, the second plate 406 may be positioned alongside the back side 20e of the actuator housing 20, and the third plate may be positioned along the top 20c of the actuator housing 20.

In some embodiments, the tabs 428 may be configured to extend from the first plate 404 and/or the second plate 406 and into the channel 410 such that they are configured to extend towards and engage a first and/or second side 20e, 20f of the actuator housing 20 disposed within the channel 410. The tabs 428 may be disposed within one or more openings 430a, 430b, 430c, 430d (collectively, 430) in the body 402 of the bracket 400. In some instances, the openings 430 may be sized to allow the user to manipulate one or more of the securement features 428 with a finger or tool, if necessary.

It is contemplated that the tabs 428 may be configured to engage a mating feature on the actuator housing 20 to limit axial movement of the bracket 400. The direction of movement control may be selected through the orientation of the tabs 428. It is contemplated that the tabs 428 may be formed such that their attachment point 432a, 432b, 432c, 432d (collectively, 432) is the same or different as desired. For example, in the illustrative embodiment in FIG. 10, the attachment point 432 extends along the bridge 456, 466 such that a free end (e.g., the end opposite the attachment point 432) of the tabs 428 is angled towards the third plate 408. However, it is contemplated that the tabs 428 may be positioned such that the free end of the tabs are angled upwards or away from the third plate 408 while in other embodiments the free end of the tabs 428 may extend toward a first end 434 or a second end 436 of the bracket 400. In other words, the tabs 428 may extend into the openings 430 from any of the first, second, or third members 450, 452, 454 of the first arm 404 or any of the first, second, or third members 460, 462, 464 of the second arm 406 or the base member 408 to arrive at the desired orientation. It is further contemplated that the body 402 may include tabs 428 having any combination of tab orientations. For example, the tab orientation may be configured to limit movement of the bracket 400 relative to the actuator in a first direction parallel to a longitudinal axis 440 or a second direction generally orthogonal to the longitudinal axis 440. It is contemplated that a tab 428 oriented towards the third plate 408 or away from the third plate 408 may limit movement of the bracket 400 in a direction generally perpendicular to the longitudinal axis 440 while a tab 428 oriented towards the first or second ends 434, 436 of the bracket 400 may limit movement of the bracket 400 in a direction generally parallel to the longitudinal axis 440. Further, while the first plate 404 and the second plate 406 are collectively illustrated as including four securement features 428, it is contemplated that the first plate 404 and the second plate 406 may each include any number securement features 428 desired, including, but not limited to, one, two, three, four, or more. It is further contemplated that the first plate 404 and the second plate 406 need not include the same number of securement features 428.

The third plate 408 may also include motion limiting features 442a, 442b (collectively, 442) configured to limit movement of the bracket 400 relative to the actuator 16. In some embodiments, the motion limiting features 442 may be clips extending generally perpendicular from the third plate 408 adjacent the second end 436 thereof. The flanges 442 may be configured to engage or be disposed within a mating recess within the second end 20b of the actuator, as desired. In some embodiments, the third plate 408 of the bracket 400 may include an annular recess 444 adjacent to the second end 436 thereof. The cutout 444 may be sized and shaped such that a drive member, such as the drive member 22 illustrated in FIG. 1, may extend through the bracket 400 unhindered or without affecting its ability to rotate. Referring to FIG. 12, the bottom surface 468 of the platform 408 may include features 470 surrounding the aperture 444 configured to engage or couple with a portion of the actuator 16 or shaft adapter 24.

The body 402 of the bracket 400 may further include one or more attachment features 446, 448 configured to attach the bracket 400 to an accessory component including, but not limited to, a valve, a crank arm mount, a reverse assembly, an external switch pack, a near-field communication (NFC) expansion modules, etc. The attachment features 446, 448 may be the same or different, as desired. For example, in some embodiments, the third plate 408 may include one or more holes or apertures 446 and/or one or more tangs 448a, 448b(collectively, 448). It is contemplated that the one or more holes 446 may be configured to receive a coupling mechanism such as, but not limited to, a screw, bolt, pin, etc. However, in other embodiments, the holes 446 may be configured to mechanically engage and/or form an interference connection with one or more corresponding features on an accessory component. It is contemplated that the third plate 408 may include any number of holes 446 desired, such as, but not limited to, one, two, three, four, or more. The tangs 448 may extend from the third plate 408 in a direction away from the channel 410. In some instances, the tang 448 may have a bent or curved shape configured to mechanically engage and/or form an interference connection with one or more corresponding features on an accessory component. For example, as can be seen in FIG. 11, the tang 448 may have a first portion 447 extending generally orthogonal to the third plate 408 and a second portion 449 extending generally parallel to and spaced a distance from the third plate 408.

The bracket 400 may be configured to be snap-fit within actuator housing 20, or otherwise assembled without the use of tools. It is contemplated that the first and/or second side 404, 406 and/or the one or more securement features 428 may have some flexibility or resilience such that once the bracket 400 is assembled with the actuator housing 20 a snug or interference fit is provided between the bracket 400 and the actuator housing 20. Once assembled, the securement features 428, the motion limiting features 442, and/or the corresponding features (e.g., channels 26 and/or first or second ends 20a, 20b) may cooperate to securely couple the bracket 400 with the actuator housing 20 while limiting movement of the bracket 400 relative to the actuator housing 20.

Figure 13:
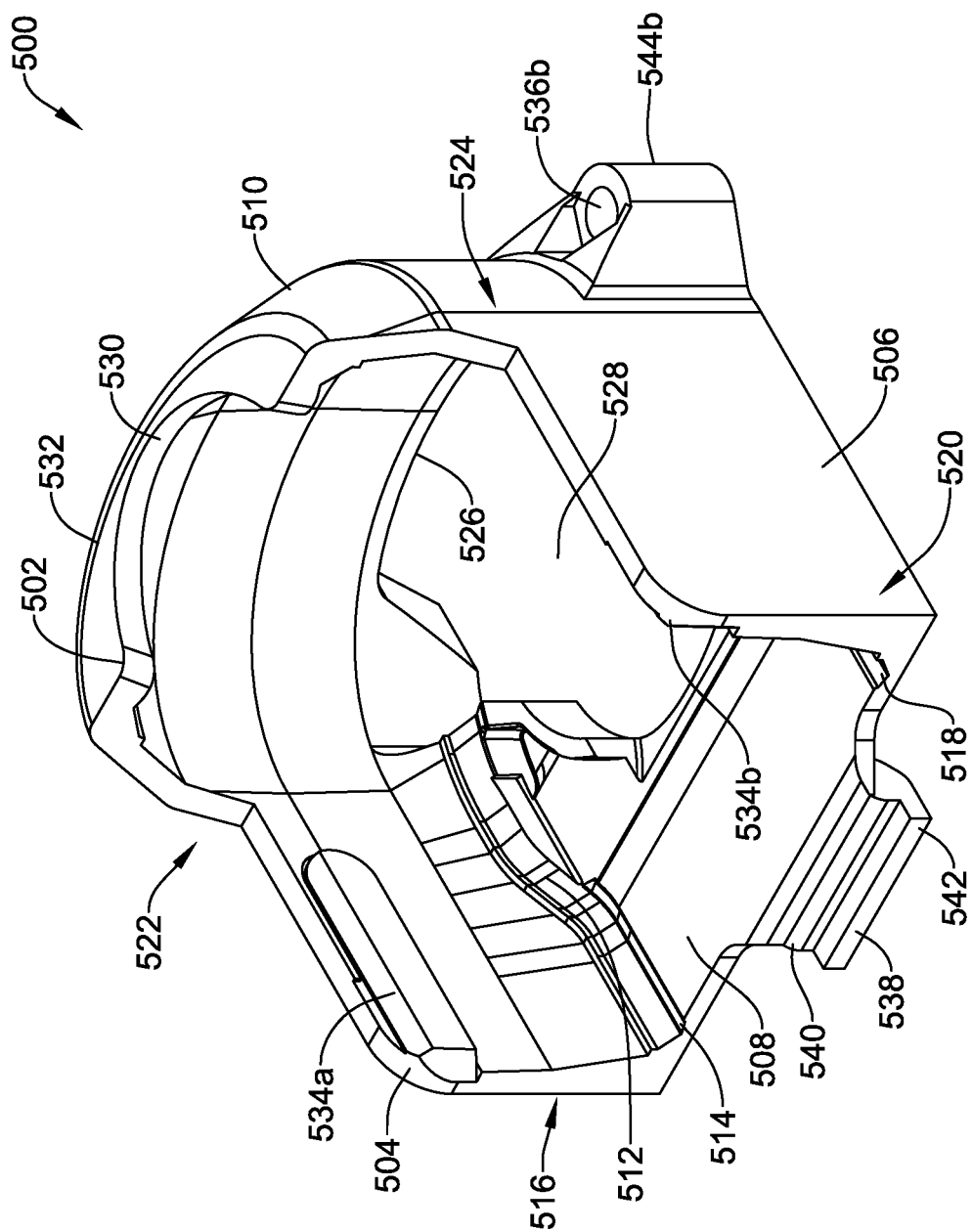
FIG. 13 is a perspective view of another illustrative bracket.
Figure 14:
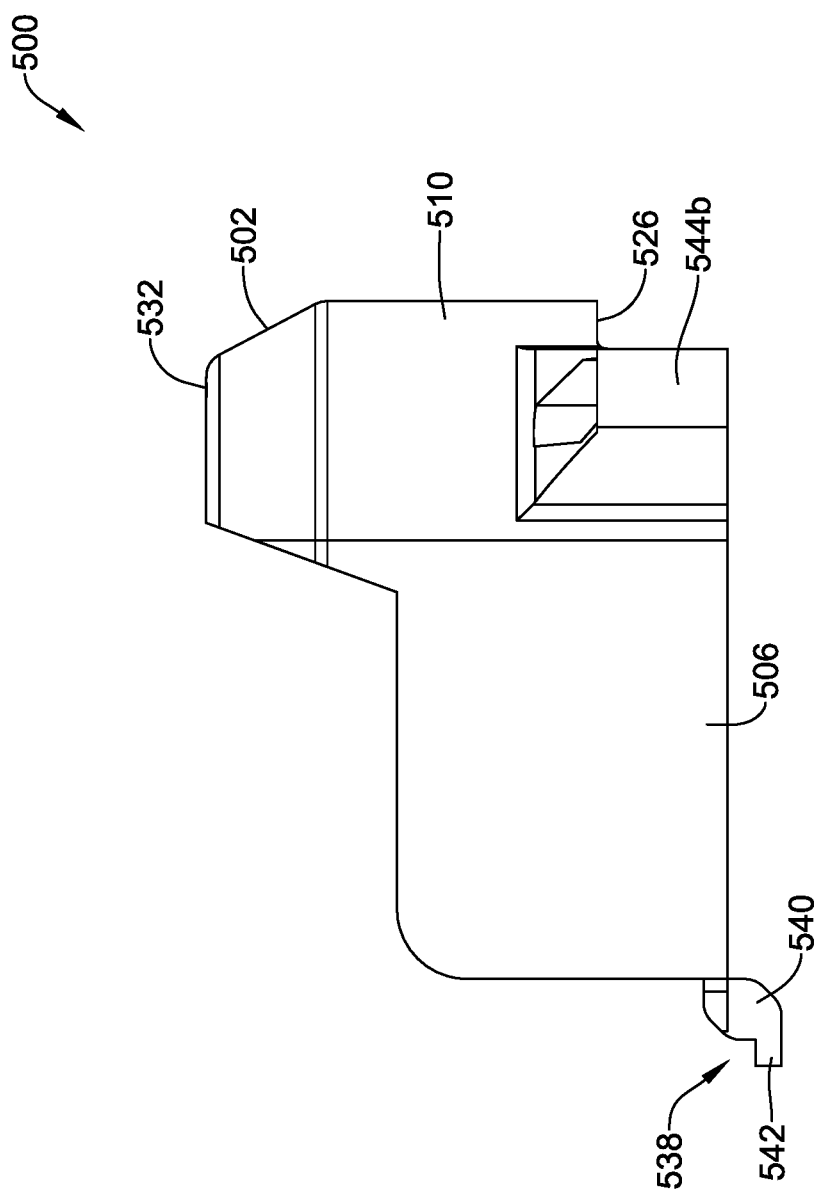
FIG. 14 is a side view of the illustrative bracket of FIG. 13.
Figure 15:
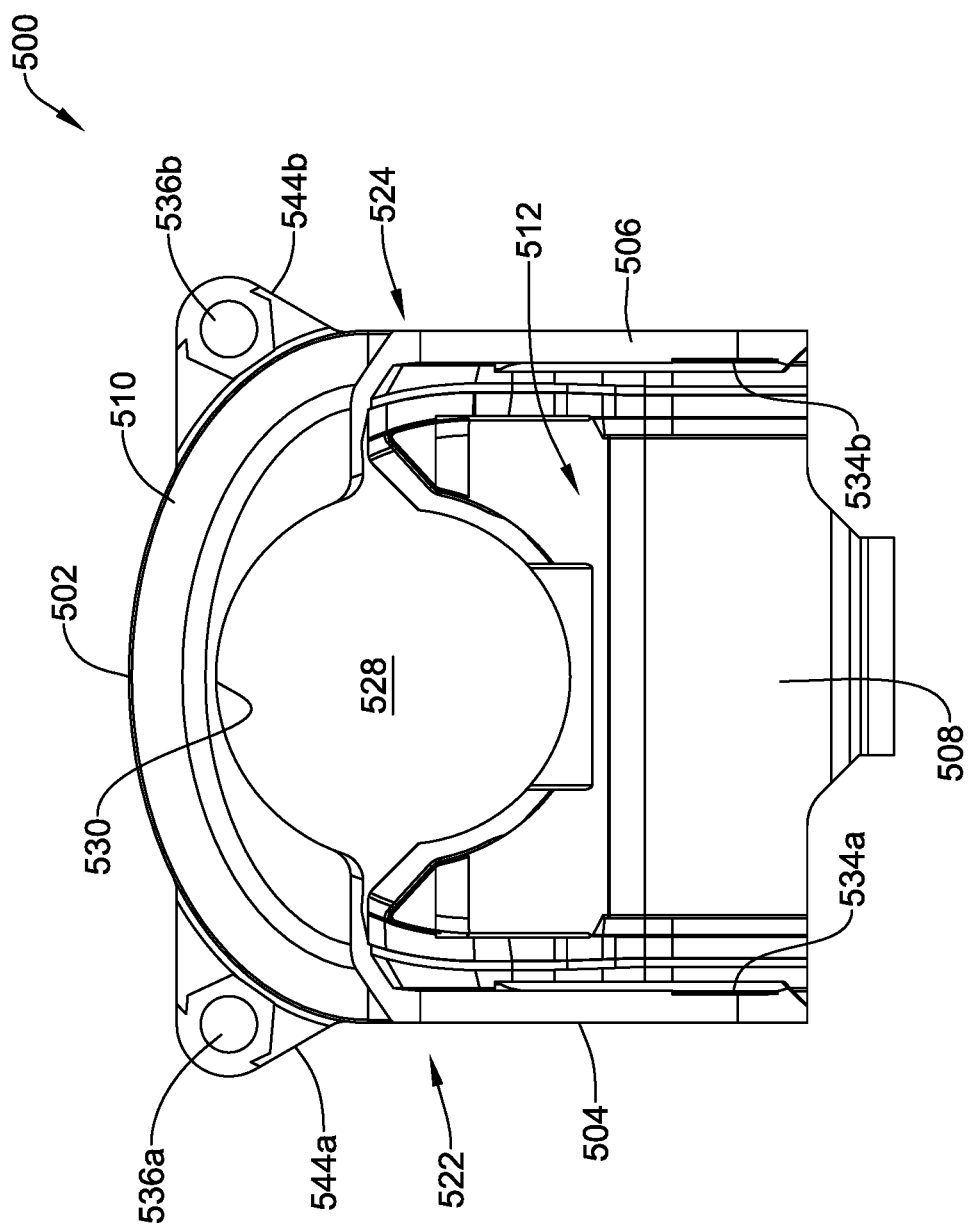
FIG. 15 is a top view of the illustrative bracket the FIG. 13.

Referring to FIG. 13 which is a perspective view of another illustrative bracket 500, FIG. 14 which illustrates a side view of the illustrative bracket 500, and FIG. 15 which illustrates a top view of the illustrative bracket 500. The bracket 500 may include a body 502 having a first plate 504, a second plate 506, a third plate 508, and a fourth plate 510. The third plate 508 may be positioned perpendicular to the first and second plates 504, 506 so as to define a generally U-shaped configuration, but this is not required. The third plate 508 may extend between the first plate 504 and the second plate 506 to define three sides of a channel or recess 512. In some instances, the first plate 504 may be coupled to or extend from a first lateral side 514 of the third plate 508 adjacent to a bottom end 516 of the first plate 504. It is further contemplated that the second plate 506 may be coupled to or extend from a second lateral side 518 of the third plate 508 adjacent to a bottom end 520 of the second plate 506. The fourth plate 510 may extend between the first plate 504 and the second plate 506 to define a fourth side of the channel 512. In some instances, the fourth plate 510 may be coupled to or extend from a second end 522 of the first plate 504 to a second end 524 of the second plate 506. In some embodiments, the fourth plate 510 may have a curved configuration which may be configured to conform to or mate with a second end 20b of an actuator housing 20. A bottom edge 526 of the fourth plate 510 may be spaced from the third plate 508 such that a drive member 22 may pass through an opening 528 between the third plate 508 and the fourth plate 510. In some embodiments, the top portion 532 of the fourth plate 510 may have a curved recess 530 sized and shaped such that a drive member, such as the drive member 22 illustrated in FIG. 1, may extend past the bracket 500 unhindered or without affecting its ability to rotate.

When the bracket 500 is secured relative to an actuator housing, the actuator housing may be disposed within the channel 512. In some embodiments, the bracket 500 may be formed as a unitary structure from a molded plastic or polymer. In other embodiments, the bracket 500 may be formed from more than one piece coupled together, as desired. It is contemplated that the bracket 500 may be formed from a metal, a polymer, composites, or combinations thereof, as desired.

The body 502 of the bracket 500 may include one or more securement features 534a, 534b (collectively, 534) configured to mechanically engage and/or form an interference fit with one or more corresponding features on a side 20e, 20f of an actuator housing 20. For example, the securement features 534 may be inwardly extending (e.g. into the channel 512) protrusions or raised regions configured to engage a slot or recess, such as the slot 26 or channel 34 illustrated in FIG. 1. However, it is contemplated that the securement features 534 may be configured to engage other features of an actuator housing, such as, but not limited to slots, protrusions (such as the protrusions 36 illustrated in FIG. 1), grooves, etc. It is contemplated that some of the protrusions (e.g., the protrusion 534a on the first plate 504) may be configured to engage corresponding features on a first side 20e of the actuator housing 20 while some of the protrusions (e.g., the protrusion 534b on the second plate 506) may be configured to engage corresponding features on a second opposing side 20f of the actuator housing 20. The first and second plates 504, 506 may be configured to flex or bend to allow the protrusions 534 to engage with the engaging feature of the actuator housing. For example, the protrusions 534 may extend a distance into the channel 512 that is greater than a depth of the engaging feature of the actuator housing such that the protrusions 534 (and/or first and second plates 504, 506) are deflected as the bracket 500 is engaged with the actuator housing 20.

It should be noted that the bracket 500 may be reversible relative to the actuator housing 20. Thus, in some embodiments, the first plate 504 may be positioned along the back side 20e of the actuator housing 20, the second plate 506 may be positioned along the front side 20f of the actuator housing 20, and the third plate 508 may be positioned along the bottom 20d of the actuator housing. When the actuator housing 20 is flipped over, the first plate 504 may be positioned along the front side 20f of the actuator housing 20, the second plate 506 may be positioned alongside the back side 20e of the actuator housing 20, and the third plate may be positioned along the top 20c of the actuator housing 20.

In some embodiments, the protrusions 534 may be configured to extend from the first plate 504 and/or the second plate 506 and into the channel 512 such that they are configured to extend towards and engage a first and/or second side 20e, 20f of the actuator housing 20 disposed within the channel 512. It is contemplated that the tabs 534 may be configured to engage a mating feature on the actuator housing 20 to limit axial movement of the bracket 500. In addition to limiting axial movement through the protrusions 534, the body 502 may be formed to conform to an outer surface of the end (for example, second end 20b) of the actuator housing 20. As the body 502 of the bracket 500 is disposed around for sides of the actuator housing 20, the size and shape body 502 of the bracket 500 may be sufficient to limit movement of the bracket 500 relative to the actuator housing 20.

The body 502 of the bracket 500 may further include one or more attachment features 536a, 536b, 538 configured to attach the bracket 500 to an accessory component including, but not limited to, a crank arm mount, reverse assembly, external switch pack, near-field communication (NFC) expansion modules, valve brackets, etc. The attachment features 536a, 536b, 538 may be the same or different, as desired. For example, in some embodiments, the third plate 508 may include one or more holes or apertures 536a, 536b (collectively, 536) and/or one or more tangs 538. It is contemplated that the one or more holes 536 may be extend through one or more flanged portions 544a, 544b (collectively, 544) and maybe configured to receive a coupling mechanism such as, but not limited to, a screw, bolt, pin, etc. However, in other embodiments, the holes 536 may be configured to mechanically engage and/or form an interference connection with one or more corresponding features on an accessory component. In some embodiments the flanges 544 may extend from the fourth plate 510, although this is not required. It is contemplated that the body 502 may include any number of holes 536 desired, such as, but not limited to, one, two, three, four, or more. The tang 538 may extend from the third plate 508 in a direction away from the channel 512. In some instances, the tang 538 may have a bent or curved shape configured to mechanically engage and/or form an interference connection with one or more corresponding features on an accessory component. For example, as can be seen in FIG. 14, the tang 538 may have a first portion 540 extending generally orthogonal to the third plate 508 and a second portion 542 extending generally parallel to and spaced a distance from the third plate 508.

The bracket 500 may be configured to be snap-fit within actuator housing 20, or otherwise assembled without the use of tools. It is contemplated that the first and/or second side 504, 506 and/or the one or more securement features 534 may have some flexibility or resilience such that once the bracket 500 is assembled with the actuator housing 20 a snug or interference fit is provided between the bracket 500 and the actuator housing 20. Once assembled, the securement features 534 the corresponding features (e.g., channels 26 and/or first or second ends 20a, 20b) may cooperate to securely couple the bracket 500 with the actuator housing 20 while limiting movement of the bracket 500 relative to the actuator housing 20.

Figure 16:
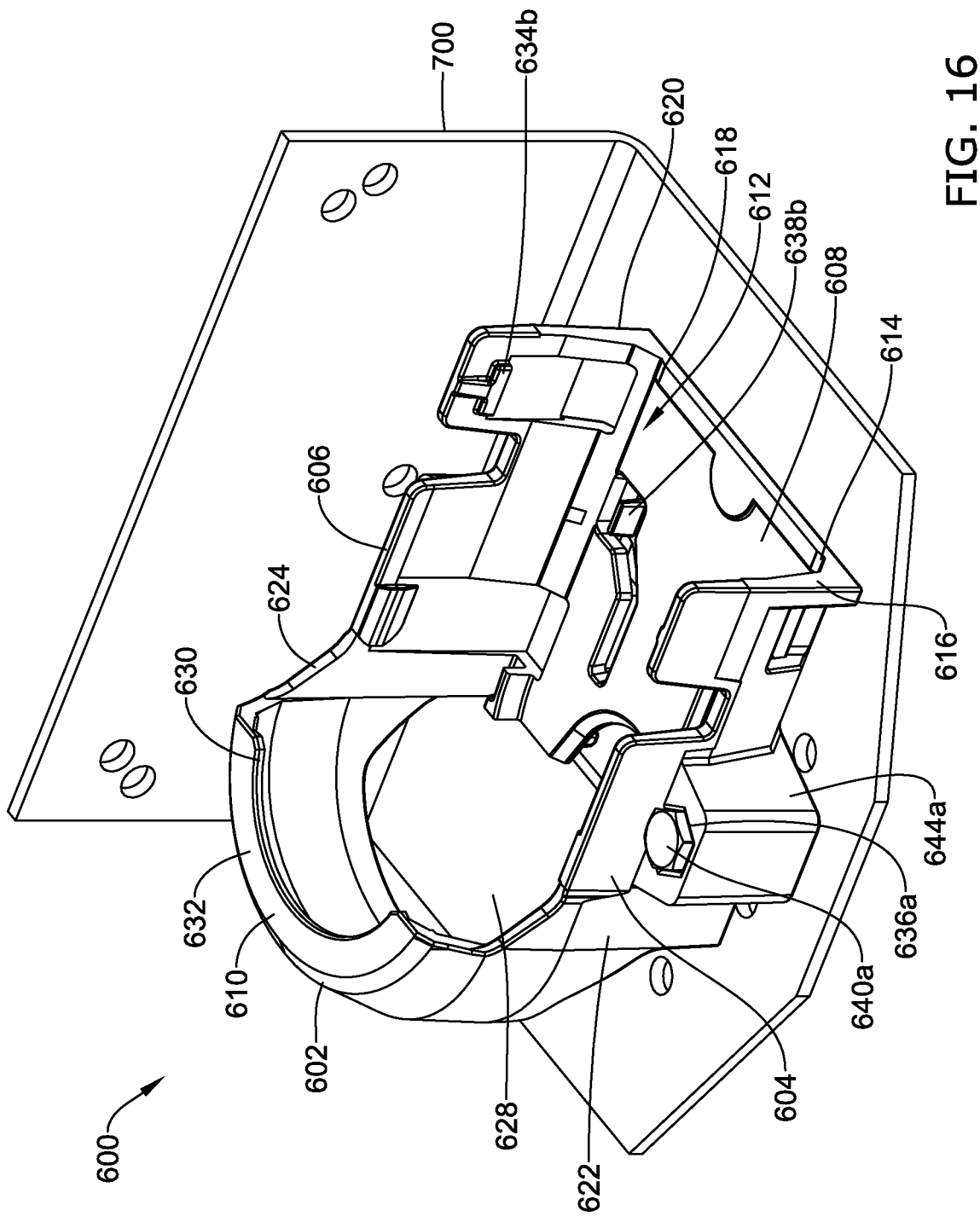
FIG. 16 is a top perspective view of another illustrative bracket mounted to an accessory component.
Figure 17:
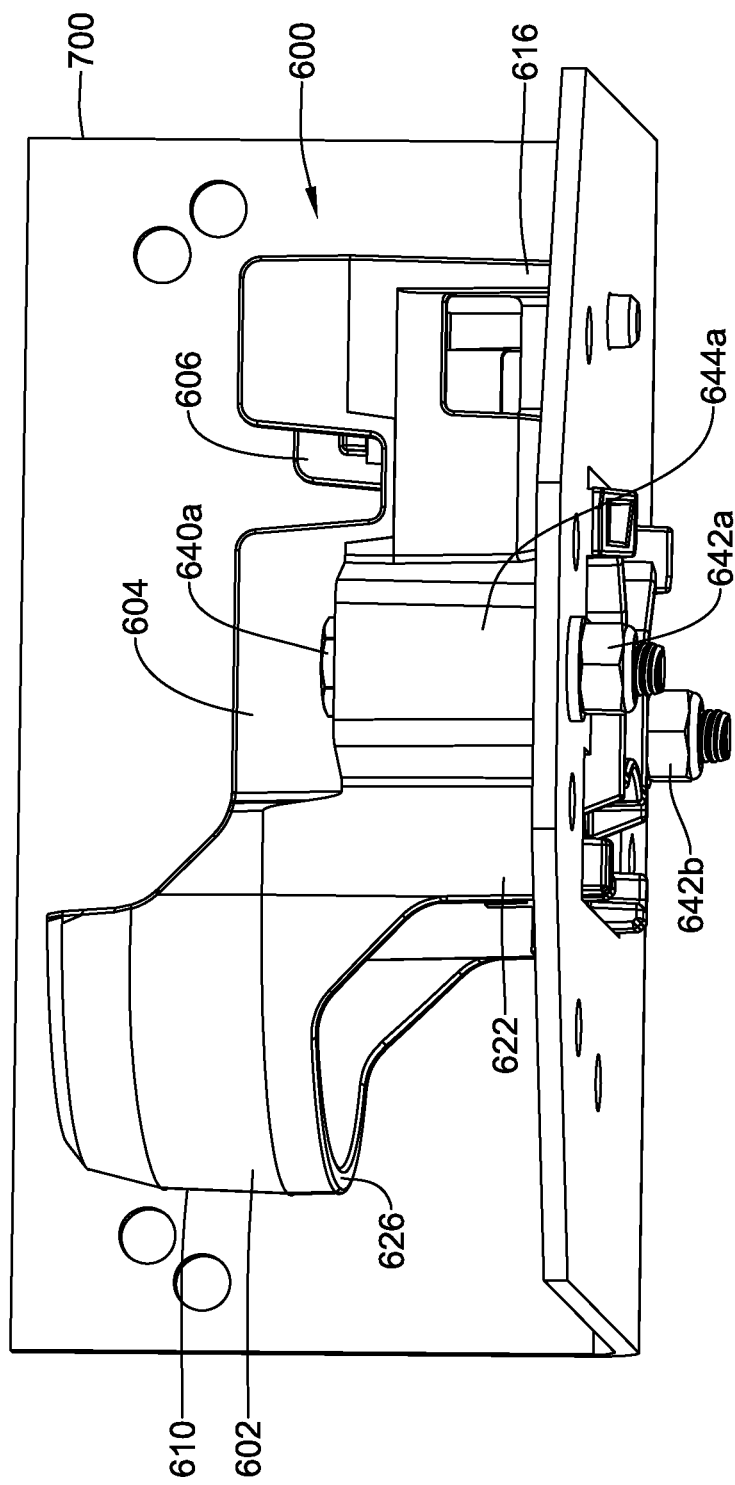
FIG. 17 is a bottom perspective view of the illustrative bracket and accessory component of FIG. 16.
Figure 18:
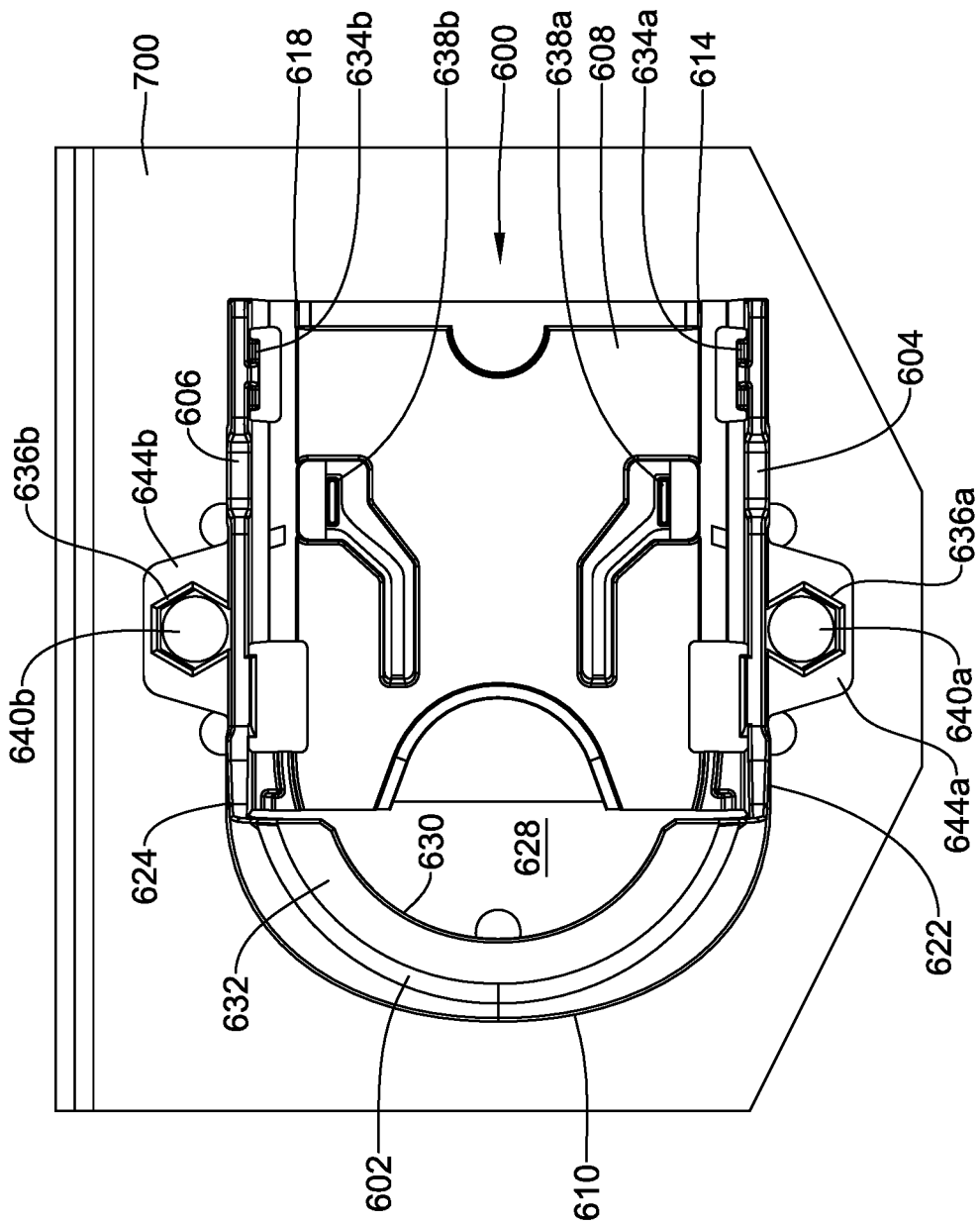
FIG. 18 which illustrates a top view of the illustrative bracket and accessory component of FIG. 16.

Referring to FIG. 16 which is a top perspective view of another illustrative bracket 600, FIG. 17 which illustrates a bottom perspective view of the illustrative bracket 600, and FIG. 18 which illustrates a top view of the illustrative bracket 600. In FIGS. 16, 17, and 18, the bracket 600 is shown coupled to an auxiliary component, such as, but not limited to a crank arm mount 700. The bracket 600 may include a body 602 having a first plate 604, a second plate 606, a third plate 608, and a fourth plate 610. The third plate 608 may be positioned perpendicular to the first and second plates 604, 606 so as to define a generally U-shaped configuration, but this is not required. The third plate 608 may extend between the first plate 604 and the second plate 606 to define three sides of a channel or recess 612. In some instances, the first plate 604 may be coupled to or extend from a first lateral side 614 of the third plate 608 adjacent to a bottom end 616 of the first plate 604. It is further contemplated that the second plate 606 may be coupled to or extend from a second lateral side 618 of the third plate 608 adjacent to a bottom end 620 of the second plate 606. The fourth plate 610 may extend between the first plate 604 and the second plate 606 to define a fourth side of the channel 612. In some instances, the fourth plate 610 may be coupled to or extend from a second end 622 of the first plate 604 to a second end 624 of the second plate 606. In some embodiments, the fourth plate 610 may have a curved configuration which may be configured to conform to or mate with a second end 20b of an actuator housing 20. A bottom edge 626 of the fourth plate 610 may be spaced from the third plate 608 such that a drive member 22 may pass through an opening 628 between the third plate 608 and the fourth plate 610, although this is not required. In some embodiments, the top portion 632 of the fourth plate 610 may have a curved recess 630 sized and shaped such that a drive member, such as the drive member 22 illustrated in FIG. 1, may extend past the bracket 600 unhindered or without affecting its ability to rotate.

When the bracket 600 is secured relative to an actuator housing, the actuator housing may be disposed within the channel 612. In some embodiments, the bracket 600 may be formed as a unitary structure from a molded plastic or polymer. In other embodiments, the bracket 600 may be formed from more than one piece coupled together, as desired. It is contemplated that the bracket 600 may be formed from a metal, a polymer, composites, or combinations thereof, as desired.

The body 602 of the bracket 600 may include one or more securement features 634a, 634b (collectively, 634) configured to mechanically engage and/or form an interference fit with one or more corresponding features on a side 20e, 20f of an actuator housing 20. For example, the securement features 634 may be inwardly extending (e.g. into the channel 612) protrusions or raised regions configured to engage a slot or recess, such as the slot 26 or channel 34 illustrated in FIG. 1. However, it is contemplated that the securement features 634 may be configured to engage other features of an actuator housing, such as, but not limited to slots, protrusions (such as the protrusions 36 illustrated in FIG. 1), grooves, etc. It is contemplated that some of the protrusions (e.g., the protrusion 634*a* on the first plate 604) may be configured to engage corresponding features on a first side 20*e* of the actuator housing 20 while some of the protrusions (e.g., the protrusion 634*b* on the second plate 606) may be configured to engage corresponding features on a second opposing side 20*f* of the actuator housing 20. The first and second plates 604, 606 may be configured to flex or bend to allow the protrusions 634 to engage with the engaging feature of the actuator housing. For example, the protrusions 634 may extend a distance into the channel 612 that is greater than a depth of the engaging feature of the actuator housing such that the protrusions 634 (and/or first and second plates 604, 606) are deflected as the bracket 600 is engaged with the actuator housing 20.

It should be noted that the bracket 600 may be reversible relative to the actuator housing 20. Thus, in some embodiments, the first plate 604 may be positioned along the back side 20*e* of the actuator housing 20, the second plate 606 may be positioned along the front side 20*f* of the actuator housing 20, and the third plate 608 may be positioned along the bottom 20*d* of the actuator housing. When the actuator housing 20 is flipped over, the first plate 604 may be positioned along the front side 20*f* of the actuator housing 20, the second plate 606 may be positioned alongside the back side 20*e* of the actuator housing 20, and the third plate may be positioned along the top 20*c* of the actuator housing 20.

In some embodiments, the protrusions 634 may be configured to extend from the first plate 604 and/or the second plate 606 and into the channel 612 such that they are configured to extend towards and engage a first and/or second side 20*e*, 20*f* of the actuator housing 20 disposed within the channel 612. It is contemplated that the tabs 634 may be configured to engage a mating feature on the actuator housing 20 to limit axial movement of the bracket 600. In addition to limiting axial movement through the protrusions 634, the body 602 may be formed to conform to an outer surface of the end (for example, second end 20*b*) of the actuator housing 20. As the body 602 of the bracket 600 is disposed around for sides of the actuator housing 20, the size and shape body 602 of the bracket 600 may be sufficient to limit movement of the bracket 600 relative to the actuator housing 20.

The body 602 of the bracket 600 may further include one or more attachment features 636*a*, 636*b*, 638*a*, 638*b* configured to attach the bracket 600 to an accessory component including, but not limited to, a crank arm mount 700, reverse assembly, external switch pack, near-field communication (NFC) expansion modules, valve brackets, etc. The attachment features 636*a*, 636*b*, 638*a*, 638*b* may be the same or different, as desired. For example, in some embodiments, the body 602 and/or third plate 608 may include one or more holes or apertures 636*a*, 636*b* (collectively, 636) and/or one or more tangs 638*a*, 638*b* (collectively, 638). It is contemplated that the one or more holes 636 may be extend through one or more flanged portions 644*a*, 644*b* (collectively, 644) and maybe configured to receive a coupling mechanism 640*a*, 640*b* (collectively, 640) such as, but not limited to, a screw, bolt, pin, etc. The coupling mechanism 640 may be secured on an opposing side of the accessory component 700 with a second coupling mechanism 642*a*, 642*b* (collectively, 642), such as, but not limited to, a nut, pin, etc. However, in other embodiments, the holes 636 may be configured to mechanically engage and/or form an interference connection with one or more corresponding features on an accessory component. In some embodiments the flanges 644 may extend from the fourth plate 610, although this is not required. It is contemplated that the body 602 may include any number of holes 636 desired, such as, but not limited to, one, two, three, four, or more. The tang 638 may extend from the third plate 608 in a direction away from the channel 612. In some instances, the tang 638 may have a bent or curved shape configured to mechanically engage and/or form an interference connection with one or more corresponding features on an accessory component.

The bracket 600 may be configured to be snap-fit within actuator housing 20, or otherwise assembled without the use of tools. It is contemplated that the first and/or second side 604, 606 and/or the one or more securement features 634 may have some flexibility or resilience such that once the bracket 600 is assembled with the actuator housing 20 a snug or interference fit is provided between the bracket 600 and the actuator housing 20. Once assembled, the securement features 634, and/or the corresponding features (e.g., channels 26 and/or first or second ends 20*a*, 20*b*) may cooperate to securely couple the bracket 600 with the actuator housing 20 while limiting movement of the bracket 600 relative to the actuator housing 20.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A bracket configured to mechanically couple an actuator with an actuator housing to an accessory component such that the actuator can actuate an actuatable component of the accessory component, the bracket comprising:
   a body;
   the body including two or more securement features for securing the actuator to the bracket, wherein:
   a first one of the two or more securement features is configured to mechanically engage and form an interference connection with one or more corresponding features on a first side of the actuator housing; and
   a second one of the two or more securement features is configured to mechanically engage and form an interference connection with one or more corresponding features on a second opposing side of the actuator housing; and
   the body further including one or more attachment features for securing the bracket to the accessory component such that the actuator can actuate the actuatable component of the accessory component.

2. The bracket of claim 1, wherein the one or more attachment features for securing the bracket to the accessory component comprises a tang.

3. The bracket of claim 1, wherein the one or more attachment features for securing the bracket to the accessory component comprises a hole extending through the body of the bracket.

4. The bracket of claim 1, wherein the first one of the two or more securement features comprise a tab that is configured to engage a corresponding tab engaging feature of the actuator housing to form the interference connection with the actuator housing.

5. The bracket of claim 4, wherein the tab is configured to initially bend when first engaging the corresponding tab engaging feature of the actuator housing before snapping into place to form the interference connection with the actuator housing.

6. The bracket of claim 5, wherein the corresponding tab engaging feature comprises a slot in the first side of the actuator housing.

7. The bracket of claim 5, wherein the corresponding tab engaging feature comprises a protrusion on the first side of the actuator housing.

8. The bracket of claim 1, wherein:
the first one of the two or more securement features comprise a first tab that is configured to engage a corresponding first tab engaging feature on the first side of the actuator housing to form a first interference connection with the actuator housing; and
the second one of the two or more securement features comprise a second tab that is configured to engage a corresponding second tab engaging feature on the second opposing side of the actuator housing to form a second interference connection with the actuator housing.

9. The bracket of claim 8, wherein the first tab extends inward toward the first side of the actuator housing and the second tab extends inward toward the second opposing side of the actuator housing.

10. The bracket of claim 9, wherein the first tab engaging feature comprises a slot in the first side of the actuator housing and the second tab engaging feature comprises a slot in the second opposing side of the actuator housing.

11. The bracket of claim 8, wherein the first tab extends outward away from the first side of the actuator housing and the second tab extends outward away from the second opposing side of the actuator housing.

12. The bracket of claim 11, wherein the first tab engaging feature comprises a protrusion on the first side of the actuator housing and the second tab engaging feature comprises a protrusion on the second opposing side of the actuator housing.

13. A bracket configured to mechanically couple a component with an actuator, the bracket comprising:
a first plate;
a second plate spaced from the first plate;
a third plate having a first end, a second end, a first lateral side, and a second lateral side, the third plate interconnecting the first plate and the second plate along the first and second lateral sides such that the first plate, the second plate and the third plate defining three sides of a channel;
the first plate defining a first tab extending into the channel;
the second plate defining a first tab extending into the channel; and
wherein, when the first tab of the first plate is engaged in a first slot of the actuator and the first tab of the second plate is engaged in a second slot of the actuator, the first tabs of the first and second plates are configured to releasably secure the bracket to the actuator and to restrict movement of the bracket relative to the actuator.

14. The bracket of claim 13, wherein:
the first plate further defines a second tab that extends into the channel;
the second plate defines a second tab that extends into the channel; and
wherein, the second tab of the first plate is engaged in a third slot of the actuator and the second tab of the second plate is engaged in a fourth slot of the actuator.

15. The bracket of claim 14, wherein the first and second slots are a common slot, and the third and fourth slots are a common slot.

16. The bracket of claim 14, wherein the first tabs of the first and second plates are configured to restrict movement of the bracket relative to the actuator in a first direction and the second tabs of the first and second plates are configured to restrict movement of the bracket relative to the actuator in a second direction generally orthogonal to the first direction.

17. A bracket configured to mechanically couple an actuator with an actuator housing to an actuatable component such that the actuator can actuate the actuatable component, the bracket comprising:
a U-shaped bracket comprising a first side and an opposing second side, with an interconnecting body connecting the first side and the second side;
the first side comprising one or more first tabs extending toward the second side;
the second side comprising one or more second tabs extending toward the first side;
the interconnecting body comprising one or more attachment features for attaching the bracket to the actuatable component such that the actuator can actuate the actuatable component.

18. The bracket of claim 17, wherein the first side comprising two or more tabs extending toward the second side, where a first one of the two or more tabs of the first side is configured to restrict movement of the bracket relative to the actuator housing in a first direction and a second one of the two or more tabs of the first side is configured to restrict movement of the bracket relative to the actuator housing in a second direction generally orthogonal to the first direction.

19. The bracket of claim 17, wherein the one or more attachment features for securing the bracket to the actuatable component comprises a hole extending through the interconnecting body of the bracket and/or a tang.

* * * * *